United States Patent
Coban et al.

(10) Patent No.: US 10,915,986 B2
(45) Date of Patent: Feb. 9, 2021

(54) ADAPTIVE PERTURBED CUBE MAP PROJECTION

(71) Applicant: QUALCOMM Incorporated, San Diego, CA (US)

(72) Inventors: Muhammed Coban, Carlsbad, CA (US); Geert Van Der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 15/925,674

(22) Filed: Mar. 19, 2018

(65) Prior Publication Data
US 2018/0268516 A1    Sep. 20, 2018

Related U.S. Application Data

(60) Provisional application No. 62/473,822, filed on Mar. 20, 2017, provisional application No. 62/479,843, filed on Mar. 31, 2017.

(51) Int. Cl.
*G06K 9/46* (2006.01)
*G06T 3/00* (2006.01)
(Continued)

(52) U.S. Cl.
CPC ............ *G06T 3/0087* (2013.01); *G06F 17/17* (2013.01); *G06T 3/0093* (2013.01);
(Continued)

(58) Field of Classification Search
CPC ..... G06T 3/0087; G06T 17/00; G06T 15/205; G06T 3/0093; G06T 2207/10016; H04N 19/597; H04N 19/85; H04N 19/172
See application file for complete search history.

(56) References Cited

U.S. PATENT DOCUMENTS

| | | | |
|---|---|---|---|
| 10,699,389 B2 * | 6/2020 | Van der Auwera | .......................... H04N 5/23238 |
| 2014/0003523 A1 * | 1/2014 | Soroushian | .......... H04N 19/597 375/240.16 |

(Continued)

OTHER PUBLICATIONS

Ye Y et al. (Algorithm descriptions of projection format conversion and video quality metrics in 360Lib) (Year: 2017).*

(Continued)

*Primary Examiner* — Solomon G Bezuayehu
(74) *Attorney, Agent, or Firm* — Polsinelli/Qualcomm

(57) ABSTRACT

Methods and systems for processing video data are provided. In one example, a first video bitstream can be obtained, which can include video frames of a spherical representation of 360-degree video data. Two-dimensional pixel coordinates of a pixel location of a planar surface of a geometry can be determined. The planar surface can be part of a plurality of planar surfaces of the geometry. Two-dimensional normalized coordinates can be determined for the pixel location based on an adaptation parameter and the two-dimensional pixel coordinates. Three-dimensional coordinates of a sample point of the spherical representation of the 360-degree video data can be determined based on the two-dimensional normalized coordinates. A pixel value for the pixel location of the planar surface of the geometry can be determined based on the sample point, and a second video bitstream can be generated that includes pixel values determined for pixel locations of the plurality of planar surfaces of the geometry.

32 Claims, 16 Drawing Sheets

(51) Int. Cl.
*H04N 19/172* (2014.01)
*H04N 19/174* (2014.01)
*G06F 17/17* (2006.01)
*H04N 19/597* (2014.01)
*H04N 19/85* (2014.01)
*G06T 17/00* (2006.01)
*G06T 15/20* (2011.01)

(52) U.S. Cl.
CPC ............ *G06T 15/205* (2013.01); *G06T 17/00* (2013.01); *H04N 19/172* (2014.11); *H04N 19/174* (2014.11); *H04N 19/597* (2014.11); *H04N 19/85* (2014.11); *G06T 2207/10016* (2013.01)

(56) References Cited

U.S. PATENT DOCUMENTS

| | | | |
|---|---|---|---|
| 2016/0300392 A1* | 10/2016 | Jonczyk | G06T 7/536 |
| 2017/0301065 A1* | 10/2017 | Adsumilli | G06T 5/001 |
| 2017/0339341 A1* | 11/2017 | Zhou | H04N 5/23238 |
| 2017/0339391 A1* | 11/2017 | Zhou | H04L 65/607 |
| 2018/0160123 A1* | 6/2018 | Van Der Auwera | H04N 19/513 |
| 2018/0262774 A1* | 9/2018 | Lin | G06T 3/60 |
| 2018/0268517 A1 | 9/2018 | Coban et al. | |
| 2019/0035149 A1* | 1/2019 | Chen | G06T 13/40 |
| 2019/0166382 A1 | 5/2019 | He et al. | |
| 2020/0107006 A1* | 4/2020 | Lee | H04N 13/178 |

OTHER PUBLICATIONS

Choi B., et al., "OMAF: Viewport-Dependent Geometry Rotation," Samsung Electronics, Jan. 16-20, 2017, 117. MPEG Meeting, Geneva; (Motion Picture Expert Group or ISO/IEC JTC1/SC29/WG11),, No. m39854, Jan. 19, 2017, XP030068199, 4 Pages.

Coban A., et al., "AHG8: Adjusted Cubemap Projection for 360-degree Video," JVET-F0025, 6th Meeting, Mar. 31-Apr. 7, 2017, Joint Video Exploration Team (JVET) of ITU-T SG 16 WP 3 and ISO/IEC JTC 1/SC 29/WG 11, Mar. 24, 2017, XP030150674, 5 Pages.

International Search Report and Written Opinion—PCT/US2018/023428—ISA/EPO—dated May 23, 2018.

Van der Auwera G., et al., "OMAF PROJ-VE: TSP for VR/360 Video," Qualcomm Incorporated, 117. MPEG Meeting, Jan. 16, 2017-Jan. 20, 2017; Geneva; (Motion Picture Expert Group or ISO/IEC JTC1/SC29/WG11),, No. m39777, Jan. 5, 2017, XP030068122, 12 pages.

Vishwanath B., et al., "AHG8: Area Weighted Spherical PSNR for 360 Video Quality Evaluation," JVET-D0072, 4. JVET Meeting; Oct. 15-21, 2016; Chengdu; (The Joint Video Exploration Team of ISO/IEC JTC1/SC29/WG11 and ITU-T SG.16); Oct. 6, 2016, XP030150305, 11 Pages.

Ye Y., et al., "Algorithm Descriptions of Projection Format Conversion and Video Quality Metrics in 360Lib," JVET-E1003, 5th Meeting, Jan. 12-20, 2017, Joint Video Exploration Team (JVET) of ITU-T SG16 WP 3 and ISO/IEC JTC /SC29/WG11, Feb. 11, 2017, XP030150650, 22 Pages.

Zhang C., et al., "AHG8: Segmented Sphere Projection for 360-degree Video," JVET-E0025, Jan. 12-20, 2017, Joint Video Exploration Team (JVET) of ITU-T SG 16 WP 3 and ISO/IEC JTC1/SC29/WG11, Dec. 30, 2016, XP030150486, 5 Pages.

\* cited by examiner

ADAPTIVE PERTURBED CUBE MAP PROJECTION

CROSS-REFERENCE TO RELATED APPLICATIONS

This application claims the benefit of U.S. Provisional Application No. 62/473,822, filed Mar. 20, 2017, and U.S. Provisional Application No. 62/479,843, filed Mar. 31, 2017, which are hereby incorporated by reference, in their entirety and for all purposes.

FIELD

This application is related to 360-degree video content. For example, systems and methods are described for providing an adaptive perturbed spherical cube map projection scheme for representing 360-degree video content.

BACKGROUND

Virtual reality (VR) describes a three-dimensional, computer-generated environment that can be interacted within a seemingly real or physical way. Generally, a user experiencing a virtual reality environment can turn left or right, look up or down, and/or move forwards and backwards, thus changing her point of view of the virtual environment. The 360-degree video presented to the user can change accordingly, so that the user's experience is as seamless as in the real world. Virtual reality video can be captured and rendered at very high quality, potentially providing a truly immersive virtual reality experience.

To provide a seamless 360-degree view, the video captured by a 360-degree video capture system typically undergoes image stitching. Image stitching in the case of 360-degree video generation involves combining or merging video frames from adjacent cameras in the area where the video frames overlap or would otherwise connect. The result would be an approximately spherical frame. Similar to a Mercator projection, however, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes are typically used to represent a spherical environment.

360-degree video can be encoded for storage and/or transmission. Video coding standards include International Telecommunication Union (ITU) ITU-T H.261, International Standards Organization/International Electronics Commission (ISO/IEC) Motion Picture group (MPEG) MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions.

BRIEF SUMMARY 360-degree video data is spherical in nature, and can be remapped to other geometries or formats. These other geometries can be represented a two-dimensions, and can used to store, encode, transmit, decode, render, and/or view the 360-degree video. One example geometric shape to be used for mapping of 360-degree video data can be an equirectangular geometry using an equirectangular projection (ERP). Another example geometric shape can be a cube using a cube map projection. Other geometries include a cylindrical geometry, a truncated square pyramid geometry, among others.

Such projection of 360-degree video data to a two-dimensional geometry may lead to non-uniform sampling of the spherical representation. For example, as part of the projection, sample points on the spherical representation may be mapped to equally-spaced points on a two-dimensional plane of the geometry. Spacing between sample points may vary with respect to the locations of the sample points on the spherical representation, which leads to non-uniform sampling. The non-uniform sampling distribution can lead to inefficient encoding of projected 360-degree video data. For instance, the non-uniform sampling distribution can lead to a large number of data bits (of the projected video frame) being used to represent small areas of the sphere (due to the larger number of sample points within those small areas) and a relatively smaller number of data bits being used to represent large areas of the sphere (due to the smaller number of sample points within those large areas). The unequal representation of different areas of the sphere in the projected 360-degree video data can degrade the efficiency of the encoding, such that excessive data bits are used to represent certain areas of the sphere while some areas are represented by insufficient number of data bits.

To improve coding efficiency, one or more systems and methods are described herein for performing cube map projection based on one or more adaptive parameters for coding 360-degree video. The one or more adaptive parameters can change a mapping relationship between locations of equally spaced points on a cube face and locations of sampled points on a sphere, such that the sampled points on the sphere can also become more equally spaced. This can improve the uniformity of sampling of a spherical representation of 360-degree video data, and more proportionate number of data bits can be used to represent different areas of the sphere. As a result, the encoding efficiency can be improved.

In some examples, techniques and systems are described herein for processing 360-degree video data. In one example, a method for processing video data is provided. The method comprises: obtaining a first video bitstream including video frames of a spherical representation of 360-degree video data; determining two-dimensional pixel coordinates of a pixel location of a planar surface of a geometry, the planar surface being part of a plurality of planar surfaces; determining, based on an adaptation parameter and the two-dimensional pixel coordinates, two-dimensional normalized coordinates for the pixel location; determining, based on the two-dimensional normalized coordinates, three-dimensional coordinates of a sample point of the spherical representation of the 360-degree video data; determining a pixel value for the pixel location of the planar surface of the geometry, the pixel value being determined based on one or more pixels of the spherical representation associated with the sample point; and generating a second video bitstream including a plurality of video frames, a video frame of the plurality of video frames including pixel values determined for pixel locations of the plurality of planar surfaces of the geometry.

In some examples, an apparatus for processing video data is provided. The apparatus may include a memory configured to store 360-degree video data, and a processor configured to: obtain a first video bitstream including video frames of a spherical representation of the 360-degree video data; determine two-dimensional pixel coordinates of a pixel location of a planar surface of a geometry, the planar surface being part of a plurality of planar surfaces; determine, based on an adaptation parameter and the two-dimensional pixel coordinates, two-dimensional normalized coordinates for the pixel location; determine, based on the two-dimensional normalized coordinates, three-dimensional coordinates of a sample point of the spherical representation of the 360-degree video data; determine a pixel value for the pixel location of the planar surface of the geometry, the pixel value being determined based on one or more pixels of the spherical representation associated with the sample point; and generate a second video bitstream including a plurality of video frames, a video frame of the plurality of video frames including pixel values determined for pixel locations of the plurality of planar surfaces of the geometry.

In some examples, a non-transitory computer-readable medium having stored thereon instructions that, when executed by one or more processors, cause the one or more processor to: obtain a first video bitstream including video frames of a spherical representation of 360-degree video data; determine two-dimensional pixel coordinates of a pixel location of a planar surface of a geometry, the planar surface being part of a plurality of planar surfaces; determine, based on an adaptation parameter and the two-dimensional pixel coordinates, two-dimensional normalized coordinates for the pixel location; determine, based on the two-dimensional normalized coordinates, three-dimensional coordinates of a sample point of the spherical representation of the 360-degree video data; determine a pixel value for the pixel location of the planar surface of the geometry, the pixel value being determined based on one or more pixels of the spherical representation associated with the sample point; and generate a second video bitstream including a plurality of video frames, a video frame of the plurality of video frames including pixel values determined for pixel locations of the plurality of planar surfaces of the geometry.

In some examples, an apparatus for processing video data is provided. The apparatus comprises: means for obtaining a first video bitstream including video frames of a spherical representation of 360-degree video data; means for determining two-dimensional pixel coordinates of a pixel location of a planar surface of a geometry, the planar surface being part of a plurality of planar surfaces; means for determining, based on an adaptation parameter and the two-dimensional pixel coordinates, two-dimensional normalized coordinates for the pixel location; means for determining, based on the two-dimensional normalized coordinates, three-dimensional coordinates of a sample point of the spherical representation of the 360-degree video data; means for determining a pixel value for the pixel location of the planar surface of the geometry, the pixel value being determined based on one or more pixels of the spherical representation associated with the sample point; and means for generating a second video bitstream including a plurality of video frames, a video frame of the plurality of video frames including pixel values determined for pixel locations of the plurality of planar surfaces of the geometry.

In some aspects, the methods, apparatuses, and computer-readable medium described above can further can include wherein determining, based on the two-dimensional normalized coordinates, a three-dimensional coordinates of the sample point includes: determining a planar surface of the plurality of planar surfaces; determining a first coordinate of the three-dimensional coordinates to be a constant based on the determined planar surface; and determining a second coordinate and a third coordinate of the three-dimensional coordinates based on the two-dimensional normalized coordinates and the determined planar surface.

In some aspects, the methods, apparatuses, and computer-readable medium described above can further can include wherein determining, based on the adaptation parameter and the two-dimensional pixel coordinates, the two-dimensional normalized coordinates for the pixel location includes: determining, for the pixel location, initial two-dimensional normalized coordinates based on the two-dimensional pixel coordinates of the pixel location; and determining, for the pixel location, the two-dimensional normalized coordinates by modifying the initial two-dimensional normalized coordinates using the adaptation parameter.

In some aspects, the methods, apparatuses, and computer-readable medium described above can include wherein determining, for the pixel location, the two-dimensional normalized coordinates by modifying the initial two-dimensional normalized coordinates using the adaptation parameter includes: determining a first two-dimensional coordinate of the two-dimensional normalized coordinates of the pixel location by modifying a first initial two-dimensional normalized coordinate of the initial two-dimensional normalized coordinates using a function, wherein the first initial two-dimensional normalized coordinate is modified by implementing the function as a function of the adaptation parameter and the first initial two-dimensional normalized coordinate; and determining a second two-dimensional coordinate of the two-dimensional normalized coordinates of the pixel location by modifying a second initial two-dimensional normalized coordinate of the initial two-dimensional normalized coordinates using the function, wherein the second initial two-dimensional normalized coordinate is modified by implementing the function as a function of the adaptation parameter and the second initial two-dimensional normalized coordinate.

In some aspects, the function may include a signum (sgn) function and a square root function, and wherein the adaptation parameter is set to a first value based on the square root function.

In some aspects, the function may include a tangent (tan) function, and wherein the adaptation parameter is set to a second value based on the tangent function.

In some aspects, the function may include a piecewise linear model including multiple pivot points, and wherein at least one of the multiple pivot points is defined by the adaptation parameter.

In some aspects, the methods, apparatuses, and computer-readable medium described above can further comprise including an indication of the adaptation parameter in the second video bitstream. In some aspects, the indication of the adaptation parameter can be included in a header associated with a tile or a slice of the video frame or a parameter set associated with the video frame or with the plurality of video frames.

In some aspects, the methods, apparatuses, and computer-readable medium described above can further comprise generating a supplemental enhancement information message; and including an indication of the adaptation parameter in the supplemental enhancement information message.

In some aspects, the methods, apparatuses, and computer-readable medium described above can further comprise transmitting the supplemental enhancement information message with the second video bitstream.

In some aspects, the methods, apparatuses, and computer-readable medium described above can further comprise extracting the adaptation parameter from the first video bitstream.

In some aspects, the methods, apparatuses, and computer-readable medium described above can further comprise extracting the adaptation parameter from an SEI message. In some aspects, the SEI message is included in the first video bitstream.

In some aspects, the geometry may include a cube, wherein the plurality of planar surfaces correspond to six surfaces of the cube, and wherein each surface of the six surfaces is tangential to a sphere of the spherical representation.

In some aspects, the apparatus comprises a mobile device with one or more cameras to capture the 360-degree video data.

In some examples, another method for processing video data is provided. The method comprises: obtaining a video bitstream including a plurality of video frames of a spherical representation of 360-degree video data, a video frame of the plurality of video frames including a plurality of planar surfaces of a geometry, wherein each planar surface of the plurality of planar surfaces includes a plurality of pixels; determining three-dimensional coordinates of a target point of the spherical representation; determining a planar surface of the geometry to which the target point is to be mapped, the planar surface being determined based on the three-dimensional coordinates of the target point; determining two-dimensional coordinates of a mapping location on the planar surface to which the target point is to be mapped based on the three-dimensional coordinates of the target point and an adaptation parameter; generating a pixel value based on one or more pixels of the plurality of pixels associated with the mapping location on the planar surface; and assigning the pixel value to the target point of the spherical representation.

In some examples, an apparatus for processing video data is provided. The apparatus comprises memory configured to store 360-degree video data, and a processor configured to: obtain a video bitstream including a plurality of video frames of a spherical representation of the 360-degree video data, a video frame of the plurality of video frames including a plurality of planar surfaces of a geometry, wherein each planar surface of the plurality of planar surfaces includes a plurality of pixels; determine three-dimensional coordinates of a target point of the spherical representation; determine a planar surface of the geometry to which the target point is to be mapped, the planar surface being determined based on the three-dimensional coordinates of the target point; determine two-dimensional coordinates of a mapping location on the planar surface to which the target point is to be mapped based on the three-dimensional coordinates of the target point and an adaptation parameter; generate a pixel value based on one or more pixels of the plurality of pixels associated with the mapping location on the planar surface; and assign the pixel value to the target point of the spherical representation.

In some examples, a non-transitory computer-readable medium having stored thereon instructions that, when executed by one or more processors, cause the one or more processor to: obtain a video bitstream including a plurality of video frames of a spherical representation of the 360-degree video data, a video frame of the plurality of video frames including a plurality of planar surfaces of a geometry, wherein each planar surface of the plurality of planar surfaces includes a plurality of pixels; determine three-dimensional coordinates of a target point of the spherical representation; determine a planar surface of the geometry to which the target point is to be mapped, the planar surface being determined based on the three-dimensional coordinates of the target point; determine two-dimensional coordinates of a mapping location on the planar surface to which the target point is to be mapped based on the three-dimensional coordinates of the target point and an adaptation parameter; generate a pixel value based on one or more pixels of the plurality of pixels associated with the mapping location on the planar surface; and assign the pixel value to the target point of the spherical representation.

In some examples, an apparatus for processing video data is provided. The apparatus comprises: means for obtaining a video bitstream including a plurality of video frames of a spherical representation of 360-degree video data, a video frame of the plurality of video frames including a plurality of planar surfaces of a geometry, wherein each planar surface of the plurality of planar surfaces includes a plurality of pixels; means for determining three-dimensional coordinates of a target point of the spherical representation; means for determining a planar surface of the geometry to which the target point is to be mapped, the planar surface being determined based on the three-dimensional coordinates of the target point; means for determining two-dimensional coordinates of a mapping location on the planar surface to which the target point is to be mapped based on the three-dimensional coordinates of the target point and an adaptation parameter; means for generating a pixel value based on one or more pixels of the plurality of pixels associated with the mapping location on the planar surface; and means for assigning the pixel value to the target point of the spherical representation.

In some aspects, the methods, apparatuses, and computer-readable medium described above can include wherein determining the two-dimensional coordinates of the mapping location on the planar surface includes: determining initial two-dimensional coordinates of the mapping location based on the three-dimensional coordinates of the target point; and determining the two dimensional coordinates of the mapping location by modifying the initial two-dimensional coordinates using the adaptation parameter.

In some aspects, the methods, apparatuses, and computer-readable medium described above can include wherein determining the initial two-dimensional coordinates based on the three-dimensional coordinates of the target point includes: determining a first initial two-dimensional coordinate of the initial two-dimensional coordinates based on a first ratio between a first three-dimensional coordinate of the three-dimensional coordinates and a second three-dimensional coordinate of the three-dimensional coordinates; and determining a second initial two-dimensional coordinate of the initial two-dimensional coordinates based on a second ratio between a third three-dimensional coordinate of the three-dimensional coordinates and the second three-dimensional coordinate of the three-dimensional coordinates.

In some aspects, the methods, apparatuses, and computer-readable medium described above can include wherein determining the two dimensional coordinates of the mapping location by modifying the initial two-dimensional coordinates using the adaptation parameter includes: determining a first two-dimensional coordinate of the two-dimensional coordinates of the mapping location by modifying the first initial two-dimensional coordinate using a function, wherein the first initial two-dimensional coordinate is modified by implementing the function as a function of the adaptation parameter and the first initial two-dimensional coordinate;

and determining a second two-dimensional coordinate of the two-dimensional coordinates of the mapping location by modifying the second initial two-dimensional coordinate using the function, wherein the second initial two-dimensional coordinate is modified by implementing the function as a function of the adaptation parameter and the second initial two-dimensional coordinate.

In some aspects, the function includes a signum (sgn) function and a quadratic function, and wherein the adaptation parameter is set to a first value based on the quadratic function.

In some aspects, the function includes an arctangent (a tan) function, and wherein the adaptation parameter is set to a second value based on the arctangent function.

In some aspects, the function includes a piecewise linear model including multiple pivot points, and wherein at least one of the multiple pivot points is defined by the adaptation parameter.

In some aspects, the video bitstream includes an indication of the adaptation parameter in a header associated with a tile or a slice of the video frame or a parameter set associated with the video frame or with the plurality of video frames, and further comprising extracting the adaptation parameter from the video bitstream.

In some aspects, the methods, apparatuses, and computer-readable medium described above can further comprise: receiving a supplemental enhancement information message, the supplemental enhancement information message including an indication of the adaptation parameter; and extracting the adaptation parameter from the supplemental enhancement information message.

In some aspects, the geometry includes a cube, wherein the plurality of planar surfaces correspond to six surfaces of the cube, and wherein each surface of the six surfaces is tangential to a sphere of the spherical representation.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
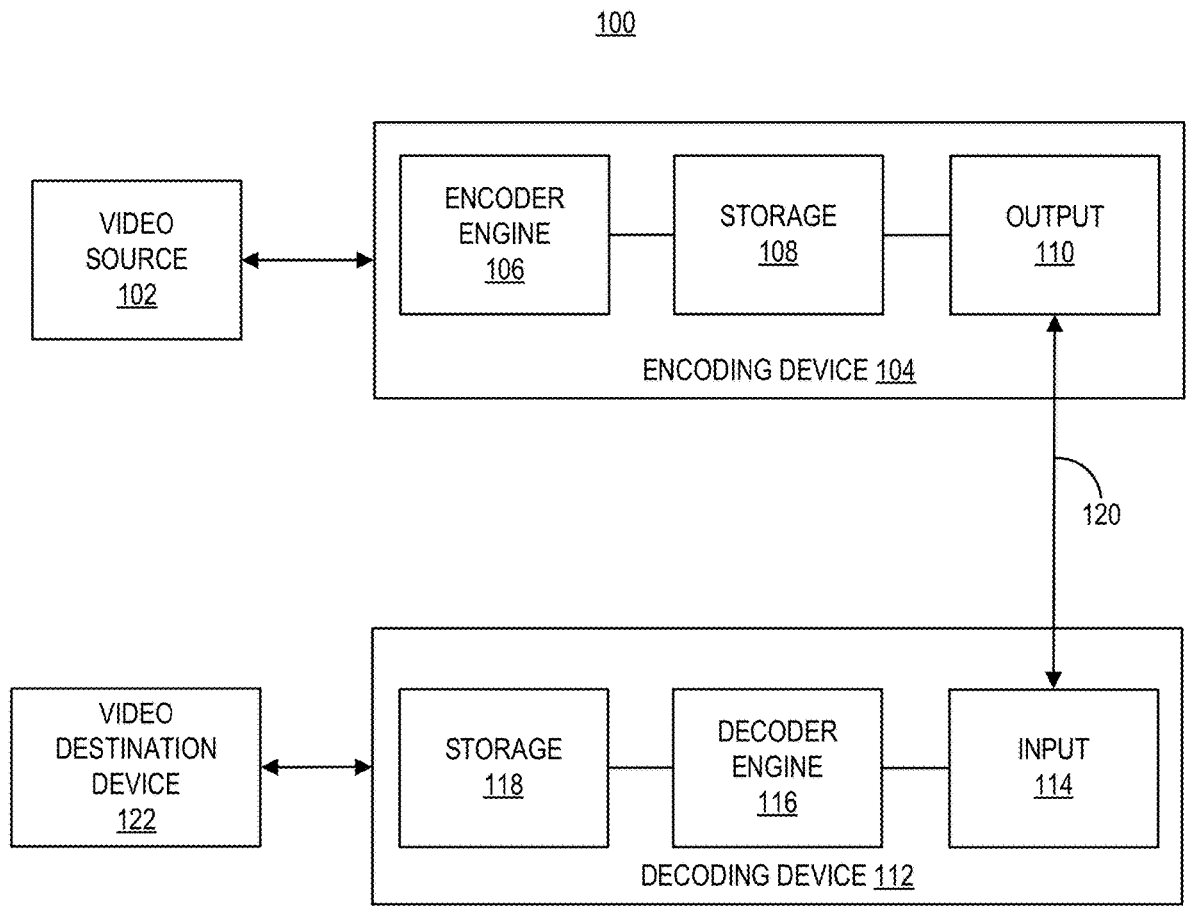
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the subject matter set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored, in which case the data is not stored via carrier waves and/or transitory electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Video content can be captured and coded as 360-degree video content. As described in more detail below, one or more systems and methods described herein are directed to providing an adaptive perturbed spherical cube map projection scheme for representing 360-degree video content.

360-degree video is video captured of a 360-degree scene or environment, and can be rendered for immersive display of the 360-degree scene or environment. For instance, 360-degree video can represent a three-dimensional scene or environment that can be interacted with in a seemingly real or physical way. In some cases, 360-degree video can be captured and rendered at very high quality (e.g., high definition, 4K ultra-high definition, 8K ultra-high definition, and/or other high quality video), potentially providing a truly immersive 360-degree video or virtual reality experience. Illustrative examples of 360-degree video can include virtual reality video, augmented reality data, or any other type of 360-degree type of video content, whether captured, computer-generated, or the like. Illustrative examples of 360-degree video applications include live sporting events, augmented reality, gaming, training, education, sports video, online shopping, among others. In some cases, a user experiencing a 360-degree video environment uses electronic equipment, such as a head-mounted display (HIVID), a mobile device, or other suitable device. In some cases, certain tools or clothing (e.g., gloves fitted with sensors) can be optionally used to interact with the virtual environment. As the user changes head orientation and/or moves in the real world, images rendered in the 360-degree video environment also change, giving the user the perception that the user is moving within the 360-degree video environment. In some cases, a 360-degree video environment can include sound that correlates with the movements of the user, giving the user the impression that the sounds originate from a particular direction or source.

In some applications, video from the real world can be used in the presentation of a 360-degree video or virtual reality environment, as opposed to computer-generated graphics that may be found, for example, in gaming and virtual worlds. In such real-world applications, a user can experience another location in the same way that the user can experience the user's present location. In one illustrative example, a user can experience a walking tour of Berlin while using a 360-degree video system that is situated in San Francisco. In some applications, 360-degree video can provide the ability to be virtually present in a non-physical world created by the rendering of natural and/or synthetic images (and in some cases sound) correlated by the movements of the immersed user, allowing the user to interact with that world.

A 360-degree video system can include a video capture device and a video display device, and possibly also other intermediate devices such as servers, data storage, and data transmission equipment. A video capture device may include a camera set, which can include a set of multiple cameras, each oriented in a different direction and capturing a different view. In one illustrative example, six cameras can be used to capture a full 360-degree view centered on the camera set's location. Some video capture devices may use fewer cameras. For example, some video capture devices can capture primarily side-to-side views or use lenses with a wide field of view. In one illustrative example, one or more cameras equipped with two fisheye lenses, positioned back-to-back, can be used to capture two images that together provide a 360-degree field of view. A video generally includes pictures (also referred to as frames or images), where a picture can include an electronically coded still image of a scene. Cameras capture a certain number of frames per second, which is usually referred to as the camera's frame rate.

In some cases, to provide a seamless 360-degree view, image stitching can be performed on the video pictures captured by each of the cameras in the camera set. Image stitching in the case of 360-degree video generation involves combining or merging video pictures from adjacent cameras (or lenses) in the area where the video pictures overlap or would otherwise connect. The result would be an approximately spherical picture, and the merged data can be represented in a planar fashion. For example, the spherical picture can be mapped to a two-dimensional representation and/or to planes of a geometry. For example, the spherical video data can be projected to an equirectangular geometry using equirectangular projection (ERP). As another example, the spherical video data can be projected to a geometry such as a cube using cube map projection. The spherical video data can also be projected onto other geometries including, for example, a truncated square pyramid (TSP), a cylinder, a dodecahedron, and/or other suitable geometry. For example, the pixels in a merged video picture may be projected or mapped onto the planes of a TSP shape, a cube shape, or some other three-dimensional, planar shape (e.g., a pyramid, an octahedron, a decahedron, etc.). Video capture and video display devices can operate on a raster principle—meaning that a video picture is treated as a grid of pixels—in which case square planes, rectangular planes, or other suitably-shaped planes can be used to represent a spherical environment.

360-degree video pictures, mapped to a geometrical planar representation, can be encoded and/or compressed for storage and/or transmission. Encoding and/or compression can be accomplished using a video codec (e.g., code that is compliant with the High-Efficiency Video Coding (HEVC) standard, which is also known as H.265, the Advanced Video Coding standard, which is known as H.264, or other suitable codec) and results in a compressed video bitstream (or encoded video bitstream) or group of bitstreams. The video pictures of 360-degree video content can be encoded as a single-layer bitstream using temporal inter prediction (TIP), and the entire coded bitstream can be stored at a server. In some cases, the pictures of 360-degree video content can be encoded as a multi-layer bitstream using TIP and inter-layer prediction (ILP). Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, mobile devices that support 360-degree video applications, and/or other 180-degree or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device (e.g., of the receiver device) may render a video at the same frame rate at which the video was captured, or at a different frame rate. If needed, the bitstream including the 360-degree video can be transmitted to the receiver side, fully decoded by the decoder, and the region of the decoded picture corresponding to a portion of a scene being viewed (referred to as the field of view (FOV) of a viewer) by the wearer can be rendered by the rendering device for viewing by the wearer. The FOV of the viewer can be determined by the head-mounted display, or other 360-degree video display device, based on the movement of the wearer's head and/or eyes.

As noted above, 360-degree video pictures (e.g., mapped or projected to a 2D format or a geometric shape), can be encoded and/or compressed for storage and/or transmission, and a receiver device can decode and/or decompress the encoded 360-degree video pictures. FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and ITU-T H.265 (also known as High Efficiency Video Coding (HEVC)). Various extensions to HEVC that deal with multi-layer video coding exist, including the range and screen content coding extensions, 3D video coding extensions (3D-HEVC) and multiview extensions (MV-HEVC), and scalable extensions (SHVC). The HEVC and its extensions have been developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many embodiments described herein provide examples using the HEVC standard and/or extensions thereof. However, the techniques and systems described herein may also be applicable to other coding standards, such as AVC, MPEG, the JEM model, extensions thereof, and/or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. A picture or frame of a video is a still image of a scene. A picture or frame of the video data can include 360-degree video data mapped or projected onto planes of a geometry (e.g., a TSP, a cube, or other suitable geometry). The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction (or other suitable prediction) to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the picture to predict any prediction unit or prediction block of the slice. A P slice (uni-directional predicted pictures) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one picture. A B slice (bi-directional predictive pictures) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may include pixel data in the spatial domain (or pixel domain). The TUs may include coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice may reference a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every picture of the video, handling of a recovery point SEI message, use of pan-scan scan rectangle SEI message in DVB, in addition to many other examples). In some examples, the SEI messages can also be transmitted separately from the video bitstream.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 12. An example of specific details of the decoding device 112 is described below with reference to FIG. 13.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

Figure 2B:
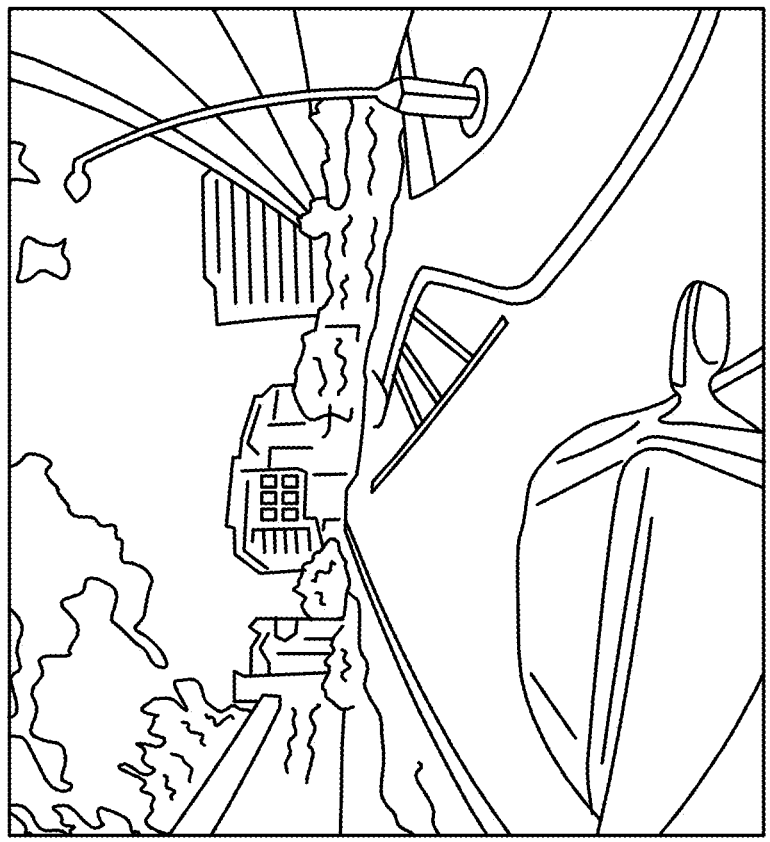
FIG. 2A and FIG. 2B are diagrams illustrating examples of video pictures captured by omnidirectional cameras that use fisheye lenses to capture a wide field of view, in accordance with some examples.
Figure 2A:
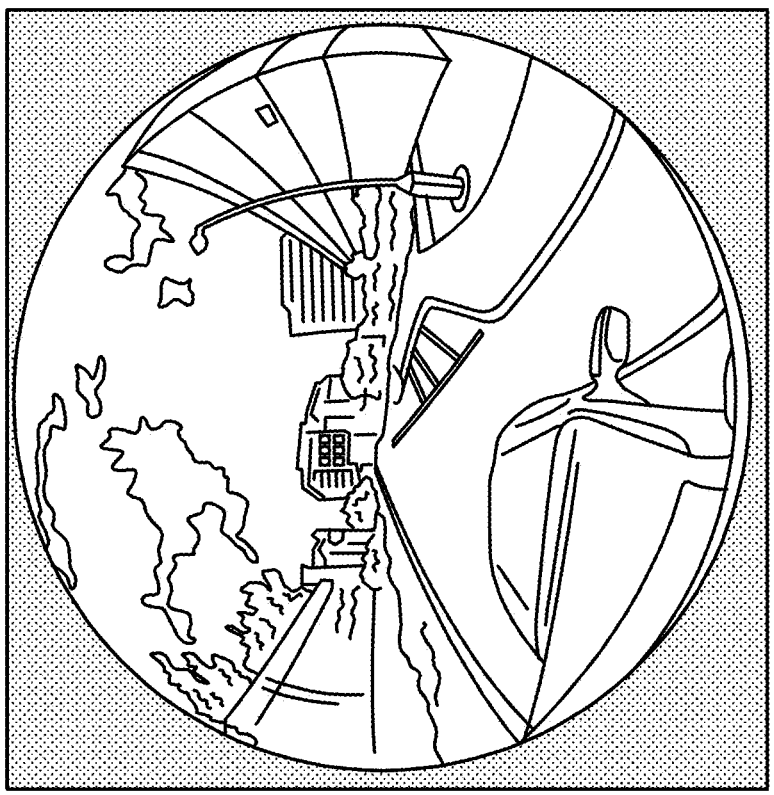

In some implementations, camera sets for capturing 360-degree video can include omnidirectional cameras, catadioptric cameras (a camera that uses lenses and curved mirrors), cameras equipped with fisheye lenses, and/or other suitable cameras. One example of an omnidirectional camera is the Ricoh Theta-S', which uses two fisheye lenses that focus in opposite directions. FIG. 2A and FIG. 2B illustrate examples of video pictures captured by omnidirectional cameras that use fisheye lenses to capture a wide field of view. In the example of FIG. 2A, the video picture 200 includes a circular fisheye image. Fisheye lenses are capable of capturing very wide angles, such as 180 degrees or greater. Hence, a camera equipped with two fisheye lenses, positioned back-to-back, can capture two images that together provide 360 degrees of view (or more). Non-wide-angle fisheye lenses capture a field of view of on the order of about 45 to about 90 degrees. A field of view can alternatively or additionally be expressed in radians.

In order to capture a wide angle, fisheye lenses distort the image of a scene. As illustrated in FIG. 2A, the scene captured in the video picture 200 is circular in shape, and is warped from the center to the outside edges of this circular region. Because camera sensors are rectangular, the video picture 200 is rectangular and the image includes areas, here illustrated using stippling, that are not part of the scene. The pixels in these regions are considered not usable, since these pixels are not part of the scene.

The example of FIG. 2B includes a video picture 202 that includes a full-frame fisheye image. In this type of video picture 202, a wide-angle field of view has also been captured in a circular region, with the scene being warped into the circular region. In this example, the image has been scaled (e.g., made larger) so the scene fills the edges of the rectangular picture. This example video picture 202 does not include the unusable areas, and some parts of the scene that can be captured by the lens have been cropped out or not captured.

As described above, other types of cameras can also be used to capture 360-degree video. For example, a camera set can include a set of multiple cameras (e.g., 5, 6, 7, or other number of cameras needed to capture a sufficient number of views of a scene). Each camera can be oriented in a different direction and capturing a different view of a scene. Image stitching can then be performed on the video pictures captured by each of the cameras in the camera set to provide a seamless 360-degree view.

Figure 3A:
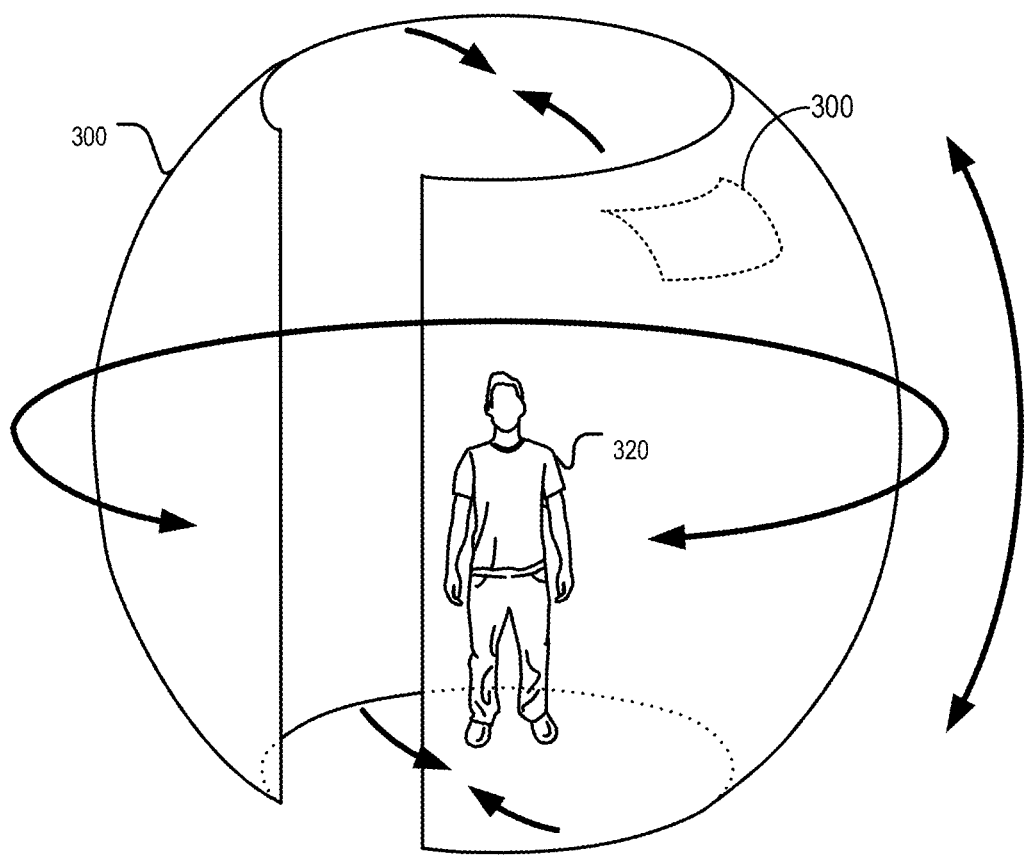
FIG. 3A and FIG. 3B are diagrams illustrating an example of a 360-degree video picture being used in a 360-degree video presentation, in accordance with some examples
Figure 3B:
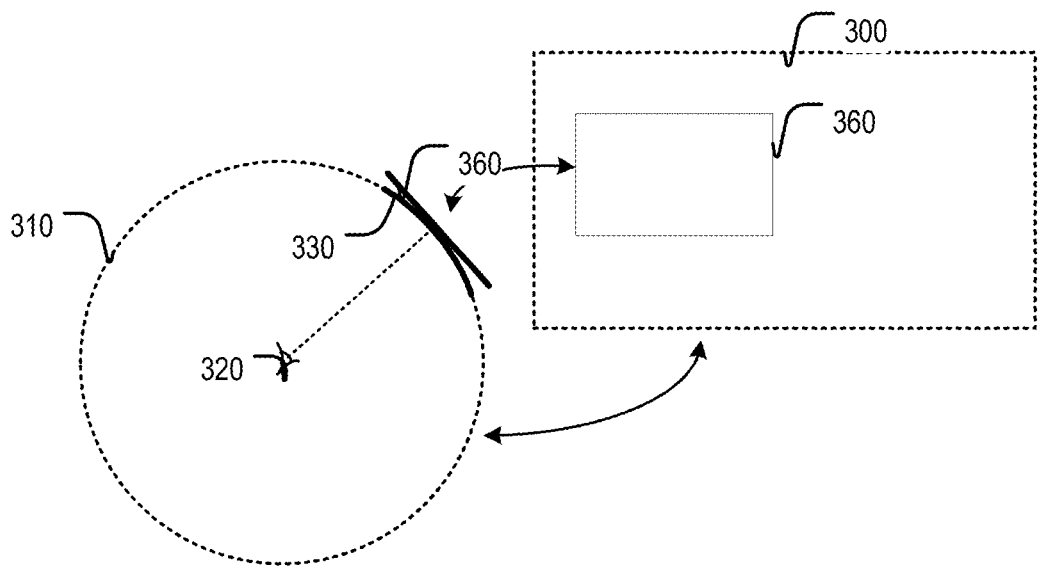

FIG. 3A and FIG. 3B illustrate an example of a 360-degree video picture 300 being used in a 360-degree video presentation. The 360-degree video picture 300 can be mapped onto a spherical space to form a spherical representation 310 (also referred to as a sphere) that represents a 360-degree scene or environment. A region 330 of the resulting spherical representation 310 (e.g., corresponding to a field of view (FOV) of a viewer 320) can be displayed to the viewer 320 using a 360-degree display device, such as a head mounted display (HMD) or a non-HMD display (e.g., a TV, a mobile device, a wearable device, or other suitable 360-degree video display device). For example, when a 360-degree video is played back on a 360-degree video display device, a viewport 360 can be rendered for display to the user. The viewport 360 can be a region (e.g., a rectangular region, or other suitable shape) on the plane of the 360-degree video picture 300 that is tangent to the sphere (e.g., the plane intersects with the sphere at a point in the region 330), where the plane of the viewport 360 is orthogonal to the user's viewing direction. In one illustrative example, a viewport can be generated by applying a projection technique to map the video data from the region 330 on the spherical representation 310 onto the plane of the 360-degree video picture 300 corresponding to the viewport 360. Examples of projection techniques include rectilinear projection (e.g., as discussed in JVET-D1030), stereographic projection, cylindrical projection, or other suitable projection techniques. In some examples, the region on the sphere that corresponds to a viewport can include the region enclosed by the four segments of four great circles (i.e., intersections of the sphere and planes that pass through the center point of the sphere).

360-degree video data is spherical in nature, and can be remapped to other geometries or formats. These other geometries can be used to store, encode, transmit, decode, render, and/or view the 360-degree video. In various implementations, the fisheye images 302A, 302B can be mapped to other geometries, such as onto the faces formed by a cube, a cylinder, a pyramid, a truncated square pyramid (TSP), or any other suitable geometric shape for coding, transmission, and/or storage. In some cases, the geometric shape can be packed into a 2D video picture using a frame packing structure. The geometric shape can then be mapped to the spherical space and used by a 360-degree video display device to display the video. Once the 360-degree video picture 300 has been mapped to the spherical representation 310, the portion of spherical representation 310 that corresponds to the viewer's FOV (e.g., viewport 360) can be displayed by rendering the viewport 360. The viewer 320, using a 360-degree video display device, can view the portion of the spherical representation 310 from within the spherical representation. In many cases, the viewer 320 is positioned such that the "ground," from the viewer's perspective, is the bottom-most point of the spherical representation. In some cases, the equator of the spherical representation 310 is positioned at the viewer's eye level. In various implementations, the spherical representation 310 can be expanded or contracted to suit the height and/or position of the viewer 320 (e.g., if the viewer 320 is sitting, standing, or in some other position).

One example geometric shape to be used for mapping of 360-degree video data can be an equirectangular geometry using an equirectangular projection (ERP). ERP may include mapping points on a sphere (e.g., a spherical representation) to a two-dimensional plane by, for example, linearly mapping the latitude and longitude of the points on the sphere to x-y coordinates on the two-dimensional plane. A well-known equirectangular projection is a Mercator projection, in which the geography of the Earth is presented with orthogonal latitude and longitude lines.

Figure 4:
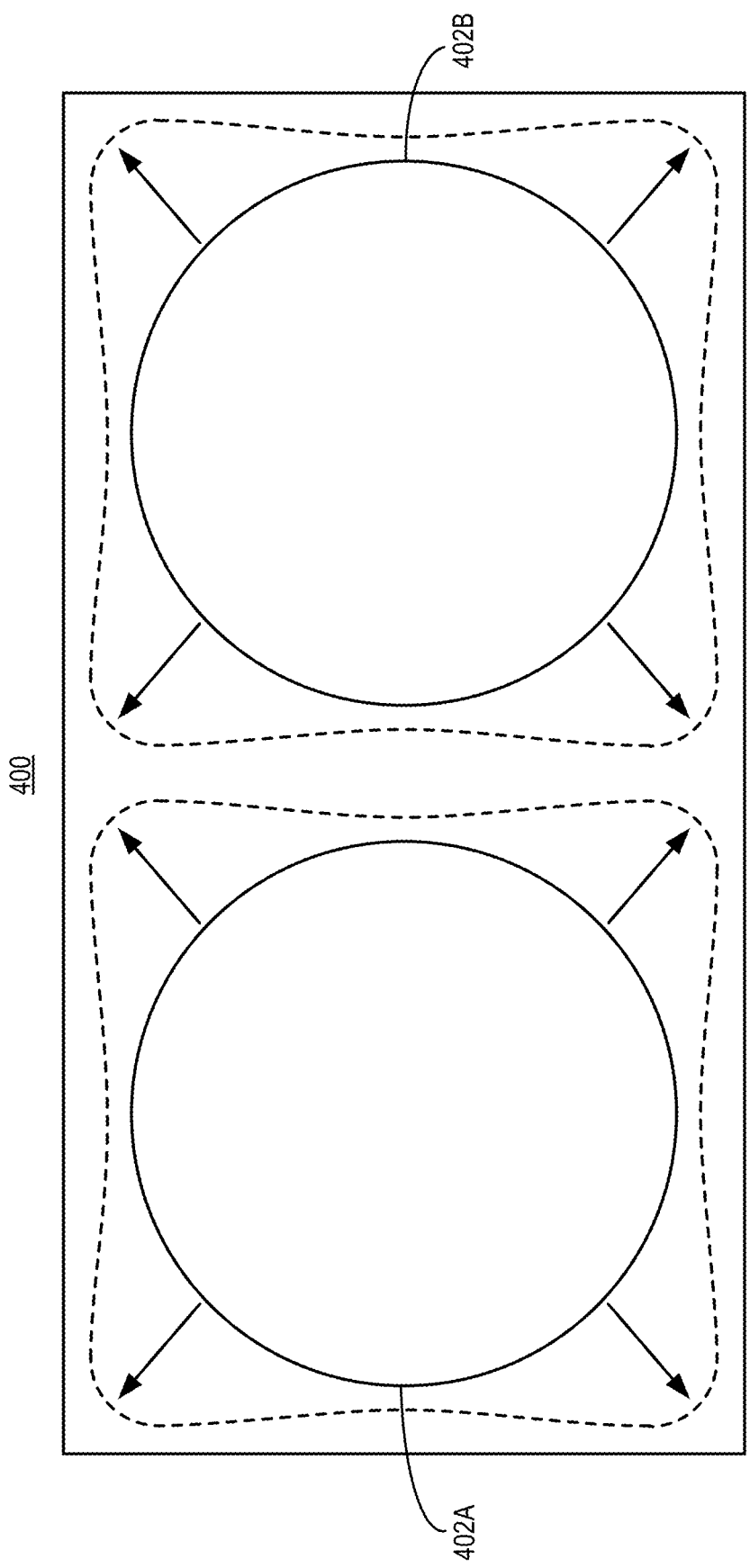
FIG. 4 is a diagram illustrating an example of an equirectangular video picture, in accordance with some examples.

FIG. 4 illustrates an example of an equirectangular video picture 400 based on two fisheye images 402A, 402B. In this example equirectangular video picture 400, the usable pixels from the two fisheye images 402A, 402B (e.g., pixels in the circular regions) have been mapped into an equirectangular geometry. In this example, each fisheye image 402A, 402B includes a 180-degree or greater field of view, so that, together, the two fisheye images 402A, 402B encompass a 360-degree field of view (possibly with some overlap).

Figure 5:
FIG. 5 are images illustrating an example of an equirectangular video frame and an associated weight map, in accordance with some examples.
Figure 5:
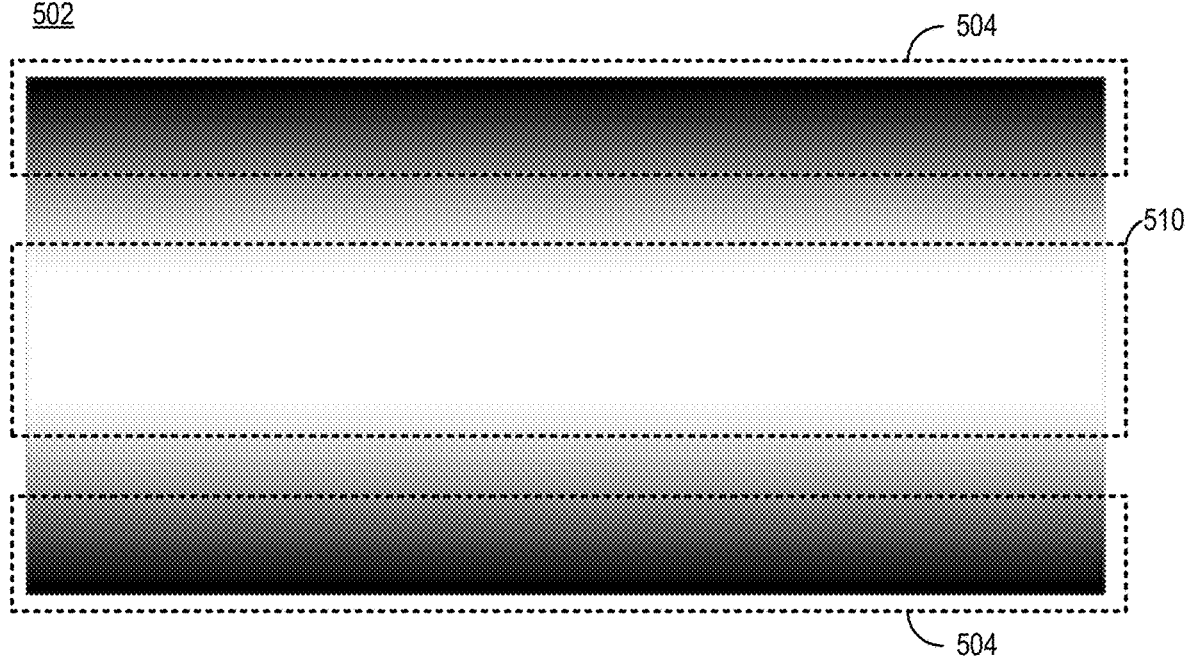

Mapping pixels from the fisheye images 402A, 402B using equirectangular projection has the effect of unwarping the scene captured in the fisheye images 402A, 402B, and stretching the pixels towards the edges of the video picture 400. The resulting equirectangular image may appear stretched at the top and bottom of the video picture 400, causing the video picture 400 to have a non-uniform distortion. An example video picture 500 formed by equirectangular projection of two fisheye images is shown in FIG. 5.

In addition, equirectangular projection may also lead to non-uniform sampling of the spherical representation. As part of the projection, sample points on the spherical representation may be mapped to equally-spaced points on the two-dimensional plane. With equirectangular projection, spacing between sample points may vary with respect to the locations of the sample points on the spherical representation, which leads to non-uniform sampling. Weight map 502 illustrates an example of non-uniform sampling introduced by equirectangular projection. In weight map 502, the level of darkness reflects a sampling density, with darker shade representing denser sampling (e.g., samples are more closely spaced) of the spherical representation. In the weight map 502, the points closer to the poles of the spherical representation (e.g., region 504 and 506), which are mapped to the edges of the two-dimensional plane, are more densely sampled than the equator of the spherical representation (region 510).

Figure 6:
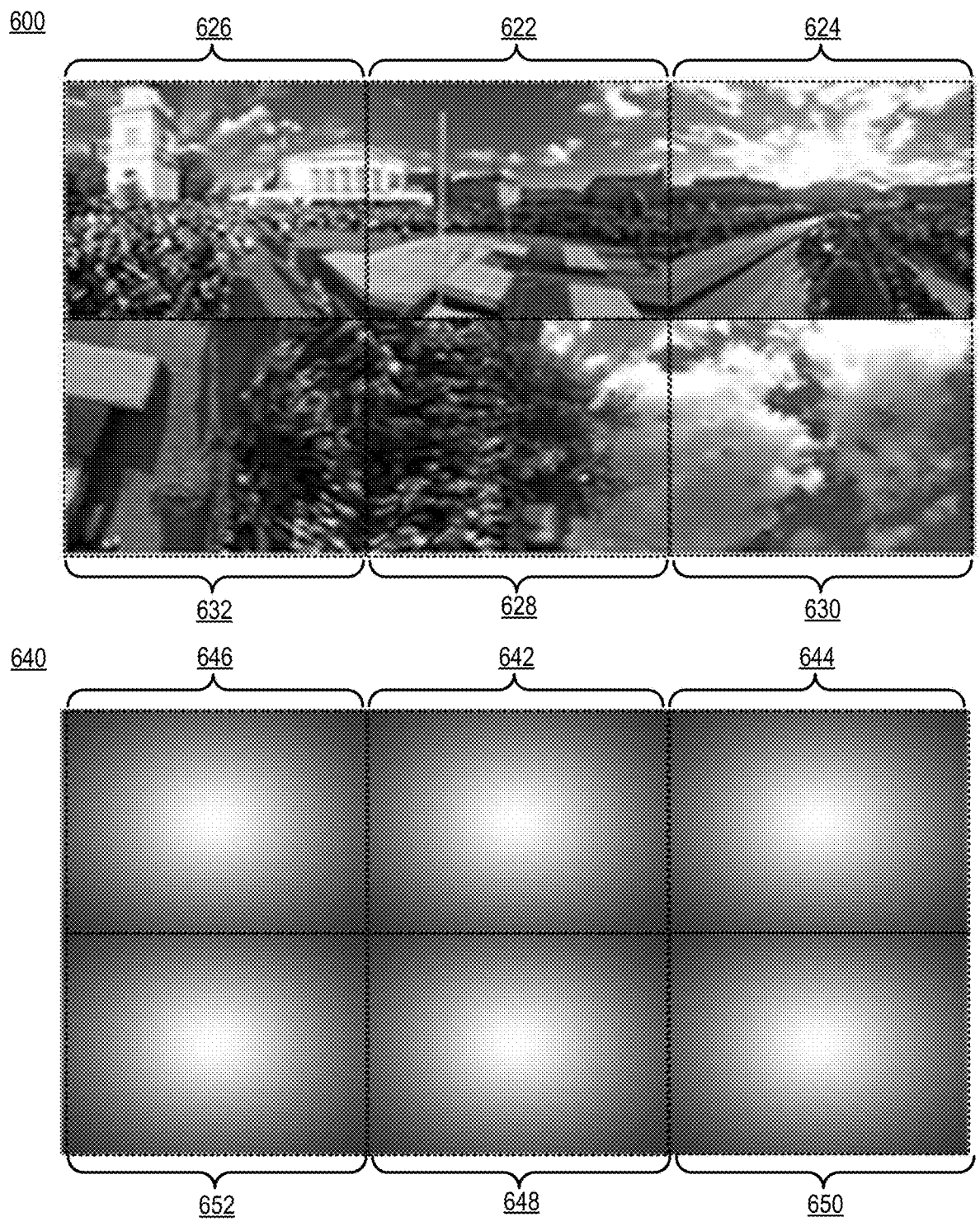
FIG. 6 are images illustrating an example of a cube map video frame and an associated weight map, in accordance with some examples.

Another example geometric shape can be a cube using a cube map projection. The cube map projection projects points on the surface of a sphere to points on planes that are tangent to the sphere surface. That is, the pixels are fitted onto the six planar surfaces of a cube, where the height, width, and length of the cube can be such that the cube fits within the sphere. FIG. 6 illustrates a video frame 600 that includes a cube map projection of a 360-degree video frame. The example of FIG. 5 is a 3×2 arrangement; that is, three cube faces across and two cube faces high. The 3×2 arrangement results in an aspect ratio which can encode efficiently. For example, less data per line of pixels needs to be stored than if an arrangement such as 1×2 is used.

In the example video frame 600 of FIG. 6, a cube face that can be considered a forward front face 622 is placed in the middle of the upper half of the video frame 600. The cube faces to the right and left of the front face (e.g., a right face 624 and a left face 626) are placed on the right and left sides, respectively, of the upper half of the video frame 600. The cube face that can be considered the back face 628 is rotated −90 degrees and placed in the center of the lower half of the video frame 600. The cube face that can be considered the upward or top face 630 is placed to the right of the back face 628, and is also rotated so that the edge of the top face 630 matches the edge of the back face 628. The cube face that can be considered the down or bottom face 632 is placed to the left of the back face 628, rotated to match the edge of the back face 628.

In the example of FIG. 6, the pixels included in the front face 622 may be selected as the view to be placed directly in front of the viewer. In other examples, a different part of the video data can be selected to be the front view. Additionally, the arrangement of the cube faces illustrates in the example video frame 600 of FIG. 6 is one example arrangement. Other arrangements are also possible.

By mapping a three-dimensional spherical representation onto multiple projection planes that also span a three-dimensional space, cube map projection can introduce less distortion to the projected image compared with equirectangular projection. However, cube map projection may also lead to non-uniform sampling of the spherical representation. As part of the projection, sample points on the spherical representation may be mapped to equally-spaced points on the cube faces. With cube map projection, spacing between sample points may also vary with respect to the locations of the sample points on the spherical representation, which leads to non-uniform sampling. Weight map 640 illustrates the sampling distributions 642, 644, 646, 648, 650, and 652, which correspond to, respectively, cube faces 622, 624, 626, 628, 630, and 632. In each of these sampling distributions, the level of darkness also reflects a sampling density, with darker shade representing denser sampling (e.g., samples are more closely spaced) of the spherical representation. As illustrated in weight map 640, sample points mapped to the edges of a cube face are more closely spaced (with darker shade) than samples mapped to the middle of the cube face.

In both the cases of cube map projection and equirectangular projection, the non-uniform sampling distribution can lead to inefficient encoding of projected 360-degree video data. For example, as explained above, with both cube map projection and equirectangular projection schemes, spacing between sample points may vary with respect to the locations of the sample points on the spherical representation. As a result, uniformly spaced points in a projected video frame may represent unequal areas of the sphere, some areas being smaller and some areas being larger. The non-uniform sampling distribution can lead to a large number of data bits (of the projected video frame) being used to represent small areas of the sphere (due to the larger number of sample points within those small areas) and a relatively smaller number of data bits being used to represent large areas of the sphere (due to the smaller number of sample points within those large areas). The unequal representation of different areas of the sphere in the projected 360-degree video data can degrade the efficiency of the encoding, such that excessive data bits are used to represent certain areas of the sphere while some areas are represented by insufficient number of data bits.

To improve coding efficiency, one or more systems and methods are described herein for performing cube map projection based on one or more adaptive parameters for coding 360-degree video. The one or more adaptive parameters can change a mapping relationship between locations of equally spaced points on a cube face and locations of sampled points on a sphere, such that the sampled points on the sphere can also become more equally spaced. This can improve the uniformity of sampling of a spherical representation of 360-degree video data, and more similar or a same number of data bits can be used to represent different areas of the sphere. As a result, the encoding efficiency can be improved. Moreover, the aspect ratio of a projected 360-degree video data frame can also be maintained.

Figure 7A:
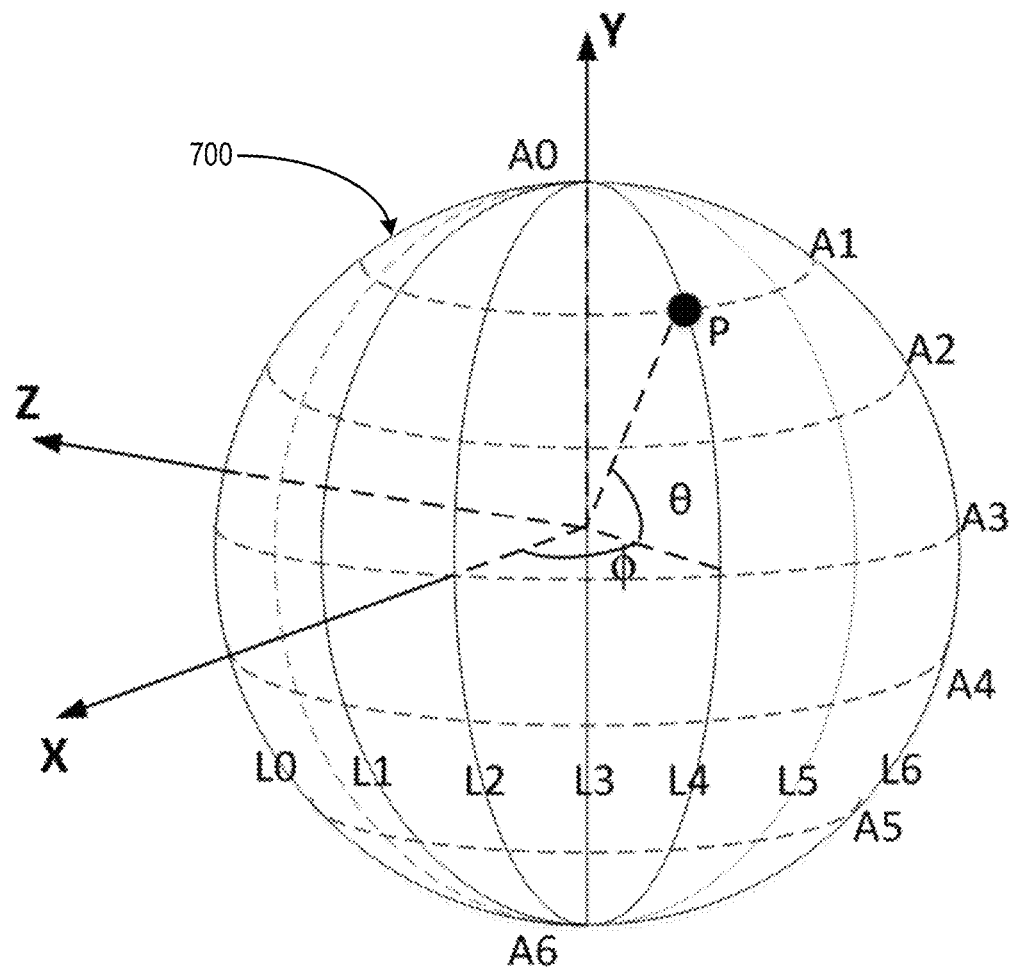
FIG. 7A, FIG. 7B, and FIG. 7C are diagrams illustrating an example of cube map projection, in accordance with some examples.
Figure 7B:
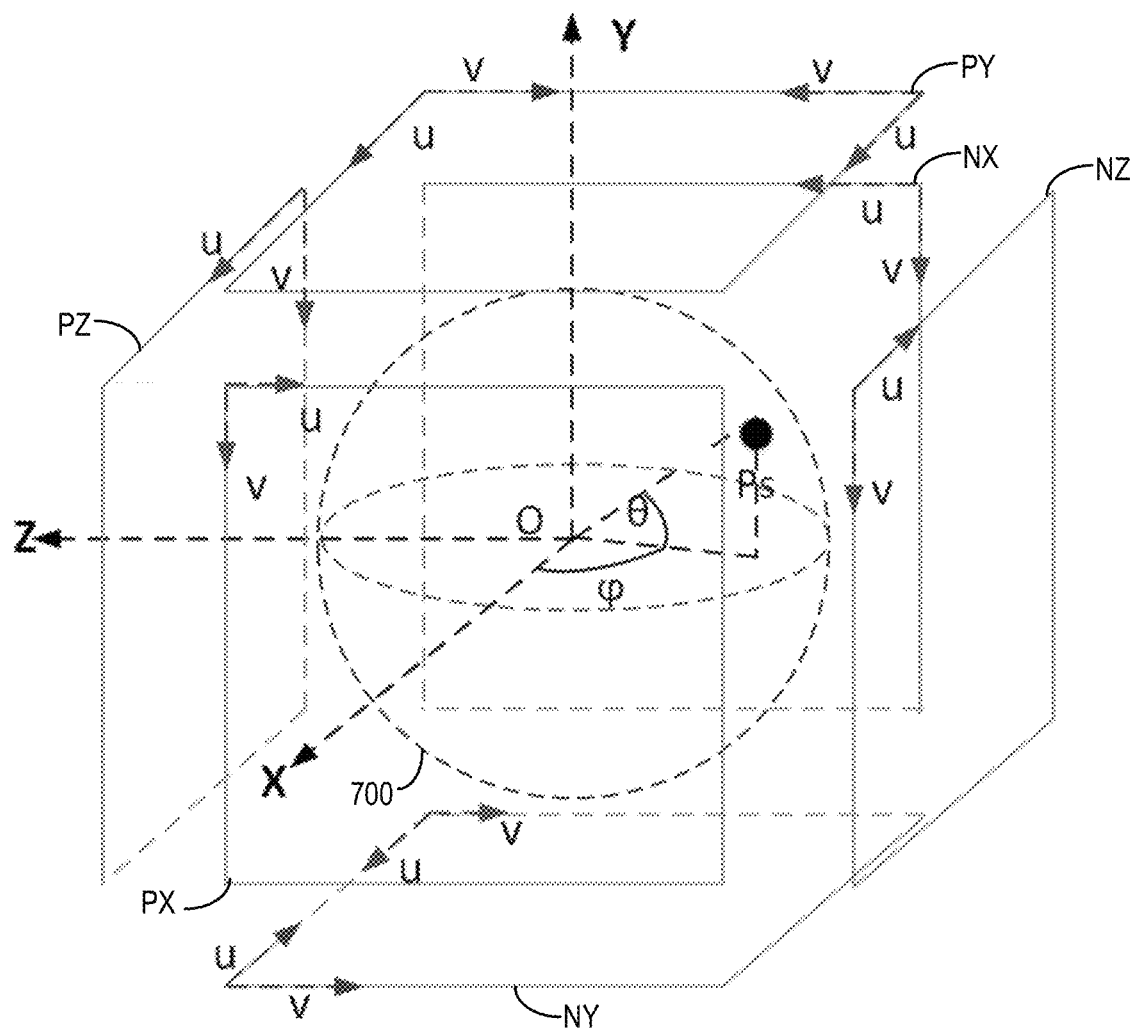
Figure 7C:
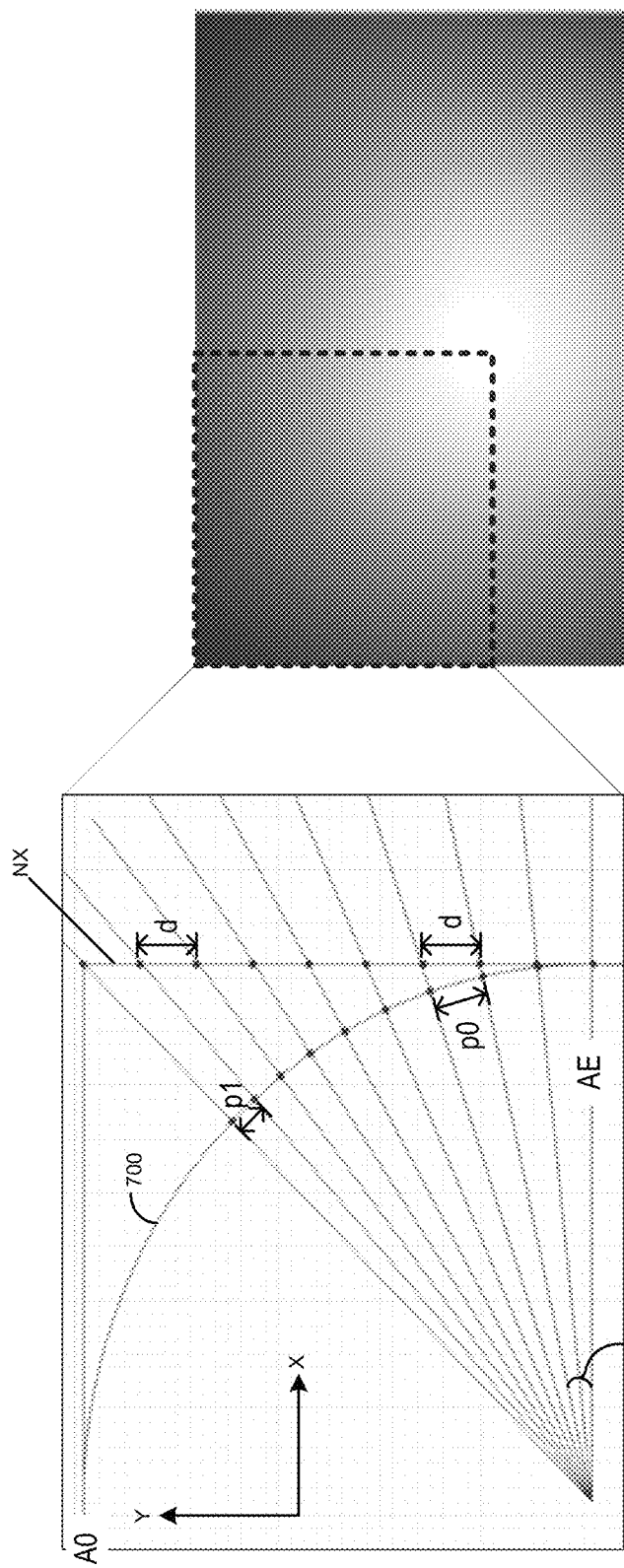

FIG. 7A, FIG. 7B, and FIG. 7C illustrate examples of a process of mapping pixels on a sphere to six planar surfaces of a cube using a cube mapping process. FIG. 7A illustrates an example of a three-dimensional coordinates system (along an X-axis, a Y-axis, and a Z-axis) of a sphere 700, with A3 being the equator. Starting from the center of the sphere, the X-axis points toward the front of the sphere, the Y-axis points toward the top of the sphere, and the Z-axis points toward the right of the sphere. The diagram in FIG. 7A shows the internal (X, Y, Z) coordinates system based on the right-hand coordinate system. The sphere can have a unit radius and can be sampled with longitude ($\phi$) and latitude ($\theta$). In aviation, the longitude $\phi$ in the range $[-\pi, \pi]$ is known as yaw, and latitude $\theta$ in the range $[-\pi/2, \pi/2]$ is known as pitch. The longitude $\phi$ is defined by the angle starting from X-axis in counter-clockwise direction, as shown in FIG. 7A. The latitude $\theta$ is defined by the angle from the equator toward Y-axis, as shown in FIG. 7A. The (X, Y, Z) coordinates on the unit sphere can be evaluated from ($\phi$, $\theta$) using the following equations (1), (2), and (3):

$$X = \cos(\theta)\cos(\phi) \quad \text{(Equation 1)}$$

$$Y = \sin(\theta) \quad \text{(Equation 2)}$$

$$Z = -\cos(\theta)\sin(\phi) \quad \text{(Equation 3)}$$

Inversely, the longitude and latitude ($\phi$, $\theta$) can be evaluated from (X, Y, Z) coordinates using the following equations (4) and (5):

$$\phi = \tan^{-1}(-Z/X) \quad \text{(Equation 4)}$$

$$\theta = \sin^{-1}(Y/(X^2+Y^2+Z^2)^{1/2}) \quad \text{(Equation 5)}$$

FIG. 7B illustrates the mapping of the pixels on cube planar surfaces (also referred to herein as cube faces or cube planes) PX, NX, PY, NY, PZ, and NZ to sphere 700. Here, "P" may stand for "positive" whereas "N" may stand for "negative". Each planar surface may be associated with a face index ranging between 0 to 5. Table 1 below illustrates an example mapping between the face index values and each of the six cube map faces.

TABLE 1

Face index of Cube Map Projection (CMP)

| Face index | Face label | Notes |
|---|---|---|
| 0 | PX | Front face with positive X-axis value |
| 1 | NX | Back face with negative X-axis value |

TABLE 1-continued

Face index of Cube Map Projection (CMP)

| Face index | Face label | Notes |
|---|---|---|
| 2 | PY | Top face with positive Y-axis value |
| 3 | NY | Bottom face with negative Y-axis value |
| 4 | PZ | Right face with positive Z-axis value |
| 5 | NZ | Left face with negative Z-axis value |

Each cube planar surface may be associated with a two-dimensional coordinate system defined by a u axis and a v axis. A point on a cube surface can be associated with two-dimensional normalized coordinates (u, v). For a 2D-to-3D coordinate conversion, given a pixel position (m, n) (or location) on a given planar surface (denoted as a face f) of the cube, two-dimensional normalized coordinates (u, v) can first be calculated. 2D-to-3D conversion can be performed to determine samples from the three-dimensional space of a sphere to use for (or map to) the pixels on the cube planar surfaces. For example, assuming that the cube surface has a dimension of A×A, a pixel with pixel coordinates of (m, n) on the planar surface can be associated with two-dimensional normalized coordinates (u, v) according to the following equations:

$$u = (m+0.5) \times 2/A - 1, 0 \le m < A \quad \text{(Equation 6)}$$

$$v = (n+0.5) \times 2/A - 1, 0 \le n < A \quad \text{(Equation 7)}$$

Here, u and v can each have a range of $[-1, 1]$, or other suitable normalized value range. For example, the range of $[-1, 1]$ can be used based on the sphere being a unit sphere.

Using a cube mapping process, a point on a cube face of a face index f (with a two-dimensional normalized coordinates (u, v)) can be mapped to a three-dimensional space spanned by the X, Y, and Z axes. For example, the three-dimensional coordinates (X, Y, Z) of the point in the three-dimensional space can determined based on the two-dimensional normalized coordinates (u, v) and the cube face index f based on the following Table 2:

TABLE 2

(X, Y, Z) derivation given (u, v) and the face index f

| f | X | Y | Z |
|---|---|---|---|
| 0 | 1.0 | −v | −u |
| 1 | −1.0 | −v | u |
| 2 | u | 1.0 | v |
| 3 | u | −1.0 | −v |
| 4 | u | −v | 1.0 |
| 5 | −u | −v | −1.0 |

Referring to Table 2, the conversion of the two-dimensional normalized coordinates (u, v) to the three-dimensional coordinates (X, Y, Z) can be different for different cube faces. For example, for a point with (u, v) coordinates of (−0.5, 0.5) on a cube face with face index 1, the point can be mapped to a point in the three-dimensional space with three-dimensional coordinates (−1, 0.5, 0.5). The mapping of a point on a cube face to a point in a three-dimensional space (2D-to-3D coordinate conversion) can be used to encode a spherical representation of 360-degree video data into a cube map representation for transport.

In a reverse cube mapping process (referred to as 3D-to-2D coordinate conversion), a point in a three-dimensional space spanned by the X, Y, and Z axes can be mapped to a point on a cube face of a face index f and with a two-dimensional normalized coordinates (u, v) and/or a two-dimensional pixel coordinates (m, n). The two-dimensional normalized coordinates (u, v) can be determined based on three-dimensional coordinates (X, Y, Z) of a three-dimensional space of the sphere shown in FIG. 7B. For instance, for 3D-to-2D coordinate conversion, given coordinates (X, Y, Z) in the three-dimensional space for which sample values need to be determined, the (u, v) and face index f (from which one or more pixel values will be mapped from for inclusion at the (X, Y, Z) coordinate location) can calculated based on the following Table 3:

TABLE 3

Derivation of (u, v) and the face index f given (X, Y, Z)

| Condition | F | u | v |
|---|---|---|---|
| \|X\| ≥ \|Y\| and \|X\| ≥ \|Z\| and X > 0 | 0 | −Z/\|X\| | −Y/\|X\| |
| \|X\| ≥ \|Y\| and \|X\| ≥ \|Z\| and X < 0 | 1 | Z/\|X\| | −Y/\|X\| |
| \|Y\| ≥ \|X\| and \|Y\| ≥ \|Z\| and Y > 0 | 2 | X/\|Y\| | Z/\|Y\| |
| \|Y\| ≥ \|X\| and \|Y\| ≥ \|Z\| and Y < 0 | 3 | X/\|Y\| | −Z/\|Y\| |
| \|Z\| ≥ \|X\| and \|Z\| ≥ \|X\| and Z > 0 | 4 | X/\|Z\| | −Y/\|Z\| |
| \|Z\| ≥ \|X\| and \|Z\| ≥ \|Y\| and Z < 0 | 5 | −X/\|Z\| | −Y/\|Z\| |

Referring to Table 3, to map a point of the sphere with three-dimensional (X, Y, Z) coordinates to a point on one of the six cube faces (e.g., PX, NX, PY, NY, PZ, and NZ in FIG. 7B), the three-dimensional (X, Y, Z) coordinates can be tested against the conditions listed in the first column of Table 3 to determine which cube face the point is to be mapped from. The u and v coordinates can then be determined based on the determined cube face. As an illustrative example, a point with pre-determined three-dimensional coordinates (X=0.4, Y=0.4, and Z=0.2) on a sphere can be mapped to cube face with face index of 0 (PX), based on X (0.4) being larger than or equal to Y (0.4) and being larger than or equal to Z (0.2), and that X being larger than zero. The u and v normalized coordinates of a point on the cube face can then be determined. Pixel values associated with the u and v coordinates can be assigned to the (X, Y, Z) coordinate location of the sphere. The u and v normalized coordinates of the mapping point on cube face PX can be determined based on the expressions in the first row as follows:

$$u = \frac{-0.2}{0.4} = 0.5 \quad \text{(Equation 8)}$$

$$v = \frac{-0.4}{0.4} = 1 \quad \text{(Equation 9)}$$

As to be discussed below, the mapping of a point on a sphere to a point on a cube face (3D-to-2D coordinate conversion) can be performed for decoding and rendering.

FIG. 7C provides a visual representation of mapping a point on a sphere to cube face NX (with a face index of 1). As shown in FIG. 7C, a point on cube face NX can be mapped to a sample point on sphere 700 (and vice versa). Each sample point on the sphere 700 and a mapping point on the cube face NX are on a line that originates from the center of sphere 700. Each line forms a latitude angle (θ) with respect to the equator AE. The v coordinate of the mapping point is given by the following equation (derived based on a combination of Table 2 and Equations 1 and 2):

$$v = -\frac{Y}{|X|} = -\frac{\sin(\theta)}{|\cos(\theta)\cos(\phi)|} = -\frac{\tan(\theta)}{|\cos(\phi)|} \quad \text{(Equation 10)}$$

Assuming the longitudinal angle (φ) is 0 for the sample points on sphere 700 shown in FIG. 7C, cos(φ) can be equal to 1, and the v coordinate of the mapping points can be related to the latitude angle (θ) by a tangent (tan) function. On the other hand, the coordinates of the sample points along the X-axis and the Y-axis are not related to the latitude angle (θ) by the tangent function. Rather, the X-coordinate of the sample point is given by cos(θ), and the Y-coordinate of the sample point is given by sin(θ).

The differences between the mapping points and the sample points in their relationships with respect to the latitude angle (θ) creates different spacing between the mapping points (on cube face NX) and between the sample points (on sphere 700). For example, as shown in FIG. 7C, the mapping points on cube face NX are equally spaced by a distance d. The corresponding sample points, however, are not equally spaced (and thus have a non-uniform distribution). For example, two sample points near equator AE are separated by a distance of p0, whereas two sample points in the middle between equator AE and pole A0 are separated by a distance of p1, which is shorter than p0. The non-uniform spacing between the sampled points can lead to a denser sampling towards the top edge of cube face NX (which can be aligned with pole A0) and less dense sampling towards the middle of cube face NX (which can be aligned with equator AE).

To improve uniformity of sampling, an adaptation parameter (denoted as parameter 'a' in the following equations) can be introduced to perform an adaptive perturbed cube mapping process. For example, when performing 2D-to-3D mapping (e.g., using equations (6) and (7) from above), the (u, v) values can be perturbed using the adaptation parameter before mapping to the final (X, Y, Z) coordinates (using Table 2 above), in order to achieve a more uniform sampling on the sphere. For instance, to map or project a point (with a two-dimensional pixel coordinates (m, n)) on a cube face (having a face index f) to a point on a sphere, two-dimensional initial normalized coordinates (u', v') can be calculated from the two-dimensional pixel coordinates (m, n) based on the equations below:

$$u'=(m+0.5)\times 2/A-1, 0 \leq m < A \quad \text{(Equation 11)}$$

$$v'=(n+0.5)*2/A-1, 0 \leq n < A \quad \text{(Equation 12)}$$

In one example, the two-dimensional initial normalized coordinates (u', v') can be modified (or perturbed) to become two-dimensional normalized coordinates (u, v) based on the following equations:

$$u = \text{sgn}(u')\frac{(a+1)-\sqrt{(a+1)^2-4a|u'|}}{2a} \quad \text{(Equation 13)}$$

$$v = \text{sgn}(v')\frac{(a+1)-\sqrt{(a+1)^2-4a|v'|}}{2a} \quad \text{(Equation 14)}$$

Here, "sgn" refers to a signum function, which can be based on the following equation:

$$\text{sgn}(x) = \begin{cases} 0 & \text{if } x = 0, \\ -1 & \text{if } x < 0, \\ 1 & \text{if } x > 0. \end{cases} \quad \text{(Equation 15)}$$

In both equations 13 and 14, adaptation parameter a can be set to any suitable value. In one illustrative example, the adaptation parameter a can be set or pre-defined to be equal to 0.36. Notice that the value of 0.36 is provided as a non-limiting example, and the value of the adaptation parameter can be adapted based on various factors including, for example, a target degree of sampling uniformity, a sampling density (e.g., a number of sampling points to be mapped to a cube face), a dimension of the cube face with respect to the spherical representation, or other suitable criteria. Different adaptation parameters can be used for, for example, different cube faces, different video frames, or different video sequences.

In another example, the two-dimensional initial normalized coordinates (u', v') can be modified to two-dimensional normalized coordinates (u, v) based on the following equations:

$$u = \frac{\tan\left(\frac{a\pi}{4}u'\right)}{\tan\left(\frac{a\pi}{4}\right)} \quad \text{(Equation 16)}$$

$$v = \frac{\tan\left(\frac{a\pi}{4}v'\right)}{\tan\left(\frac{a\pi}{4}\right)} \quad \text{(Equation 17)}$$

Both equations 16 and 17 include a tangent function (tan) of initial normalized coordinate (u' or v') scaled by the adaptation parameter a. In Equations 16 and 17, the value of adaptation parameter a can be set to any value including, for example, a value of one. In a case where the value of adaptation parameter a equals to one, equations 16 and 17 can become:

$$u = \tan\left(\frac{\pi}{4}u'\right) \quad \text{(Equation 18)}$$

$$v = \tan\left(\frac{\pi}{4}v'\right) \quad \text{(Equation 19)}$$

In some examples, equations 13 to 19 can also be represented in the form of pre-configured lookup tables, which can be implemented using a set of multiplexer circuits in a hardware processor. The multiplexer circuits can be coupled with a set of registers storing a set of candidate values for coordinates u and v (pre-determined based on the adaptation parameter) and can set an output value from the candidate value based on an input initial normalized coordinates value (u' or v'). In some examples, equations 13 to 19 can also be represented as a polynomial (e.g., a Taylor series expansion of a tangent function, a square root function, etc.) comprising a set of coefficients determined based on the adaptation parameter. The set of coefficients, as well as the initial normalized coordinates u' and v', can be provided to an arithmetic circuit to perform polynomial computations to compute normalized coordinates u and v. In some examples, equations 13 to 19 can also be expressed in a form of a piecewise linear model, and the adaptation parameters can be included in a set of parameters that define the piecewise linear model (e.g., number of pivot points, function values of pivot points, or other suitable parameters).

The resulting normalized coordinate (u, v) values are then mapped to (X, Y, Z) coordinates on the sphere using Table 2. For example, after determining the normalized coordinates (u, v) of a location on a cube face with a particular face index f, the corresponding sample point (X, Y, Z) on a spherical representation can be determined based on Table 2. The samples from the (X, Y, Z) location on the sphere can then be assigned to the normalized coordinate (u, v) location on the face of the cube.

The 2D-to-3D cube map projection process can be used to generate a video bitstream to transport a cube map representation of 360-degree video data. For example, for each frame of a spherical representation of 360-degree video data, an encoder can project the frame onto six cube faces. For each pixel on each cube face, the encoder can determine a two-dimensional normalized coordinates (u, v) of a pixel location based on equations 11-19. The encoder can refer to table 2 and, based on the face index and the two-dimensional normalized coordinates (u, v), can determine three-dimensional coordinates (X, Y, Z) of a sample point on the sphere. The encoder can then obtain a pixel from that sample point (or generate a pixel by performing interpolation of pixels closest to that sample point), and assign the pixel to the (u, v) normalized coordinate of the pixel location on the cube face. The encoder can generate video bitstream data to include video frames with the cube faces. A video frame can include pixel values determined for pixel locations of the cube faces. The video bitstream can include information that associates each pixel with a cube face and with the two-dimensional normalized coordinates (u, v) (or the two-dimensional pixel coordinate (m,n)).

In some examples, an encoder may extract the adaptation parameter from the video bitstream containing 360-degree video data, or from other sources. For example, the adaptation parameter can be extracted from a supplemental enhancement information (SEI) message at sequence level, frame level, etc., and the encoder can obtain the SEI message either from the video bitstream or as standalone data. As another example, the adaptation parameter can be defined in various parameter sets at a sequence level, at a picture level, in a tile header, in a slice header, or in other suitable level and/or granularity in the video bitstream containing 360-degree video data.

Moreover, as part of the encoding process to generate a video bitstream including a cube map representation, the encoder can also include the adaptation parameter in the video bitstream or as separate data to be transmitted with the bitstream, to signal the adaptation parameter to the decoder. The encoder may, for example, generate another SEI message at sequence level, frame level, or at a cube face level, and include the adaptation parameter in the SEI message. The SEI message can be part of the video bitstream or can be standalone data. The adaptation parameter can also be defined in various parameter sets at a sequence level, at a picture level, in a tile header, in a slice header, or in other suitable level and/or granularity for the video bitstream including the cube map representation.

On the decoder side, a reverse adaptive perturbed cube mapping process (3D-to-2D coordinate mapping) can be performed to decode the cube map representation for reconstructing a spherical representation of the 360-degree video data. In some cases, for the 3D-to-2D mapping, to determine the two-dimensional normalized coordinates of a particular pixel of a cube face mapped to the three-dimensional coordinates (X, Y, Z) of a target point on the sphere, the decoder can first obtain initial two-dimensional normalized coordinates (u', v') for the pixel on the cube face (e.g., using the Table 3 formulas), and can then modify the initial two-dimensional normalized coordinates (u', v') to become the two-dimensional normalized coordinates (u, v) based on an adaptation parameter. For example, for the 3D-to-2D mapping, (X, Y, Z) values on the sphere are mapped to two-dimensional normalized coordinate (u, v) values of a cube face according to the formulas in Table 3. Starting from the (u, v) values from Table 3 and assigning them as u', v', respectively (i.e. u→u', v→v'), the u', v' values can then be modified (or perturbed) using equations (20) and (21) or (22) and (23) below, resulting in the final (u, v) values.

In one example, the two-dimensional normalized coordinates (u, v) can be determined based on the following equations:

$$u = \mathrm{sgn}(u')(-a(u')^2 + (a+1)|u'|) \quad \text{(Equation 20)}$$

$$v = \mathrm{sgn}(v')(-a(v')^2 + (a+1)|v'|) \quad \text{(Equation 21)}$$

Here, "sgn" refers to a signum function of equation 15. Both Equations 20 and 21 include a quadratic function of a normalized coordinate (u or v) based on an adaptation parameter a. In Equations 20 and 21, the value of adaptation parameter a can be set to, for example, 0.36, or the adaptation value used for generation of the cube map representation. On the other hand, setting the adaptation parameter to zero will equate the adapted normalized coordinates (u', v') with the normalized coordinates (u, v).

In another example, the two-dimensional normalized coordinates (u, v) can also be determined based on the following equations:

$$u = \frac{\tan^{-1}(au')}{\tan^{-1}(a)} \quad \text{(Equation 22)}$$

$$v = \frac{\tan^{-1}(av')}{\tan^{-1}(a)} \quad \text{(Equation 23)}$$

Both equations 22 and 23 include an arctangent function (a tan or $\tan^{-1}$) of a normalized initial coordinate (u' or v') scaled by the adaptation parameter a. In Equations 22 and 23, the value of adaptation parameter a can be set to, for example, one, or the adaptation value used for generation of the cube map representation. In a case where the value of adaptation parameter a equals to 1, equations 22 and 23 can become:

$$u = \frac{4}{\pi}\tan^{-1}(u') \quad \text{(Equation 24)}$$

$$v = \frac{4}{\pi}\tan^{-1}(v') \quad \text{(Equation 25)}$$

In some examples, equations 20-25 (as well as other equations described above) can be represented in the form of pre-configured lookup tables, which can be implemented using a set of multiplexer circuits in a hardware processor. The multiplexer circuits can be coupled with a set of registers storing a set of candidate values for coordinates u and v (pre-determined based on the adaptation parameter) and can set an output value from the candidate value based on an input initial normalized coordinates value (u' or v'). In some examples, equations 20-25 can also be represented as a polynomial (e.g., a Taylor series expansion of a tangent function, a square root function, etc.) comprising a set of coefficients determined based on the adaptation parameter. The set of coefficients, as well as the initial normalized coordinates u' and v', can be provided to an arithmetic circuit to perform polynomial computations to compute normalized coordinates u and v. In some examples, equations 20-25 can also be expressed in a form of a piecewise linear model, and the adaptation parameters can be included in a set of parameters that define the piecewise linear model (e.g., number of pivot points, function values of pivot points, or other suitable parameters).

As discussed above, the reverse adaptive perturbed cube mapping process (3D-to-2D coordinate mapping) can be used to decode a video bitstream including cube map representations that represent 360-degree video data, and to reconstruct the spherical representation of the 360-degree video data. For example, in order to obtain a pixel value for a pixel location on a sphere with three-dimensional coordinates (X, Y, Z), a decoder can determine a cube face (associated with a particular face index f) and the two-dimensional initial normalized coordinates (u', v') of a mapping point on the cube face based on Table 3. The decoder can also compute two-dimensional normalized coordinates u and v from the two-dimensional initial normalized coordinates (u', v') based on any of the equations 20-25. The decoder can extract a pixel from the determined cube face at the location of the two-dimensional normalized coordinates (u, v) (or perform an interpolation of pixels closest to that location), and provide the pixel to a renderer for displaying at the three-dimensional coordinates (X, Y, Z). In some examples, additional projection (e.g., rectilinear projection) may be performed to project the pixel onto a two-dimensional display as described in FIG. 3B.

As part of the decoding process, the adaptation parameter can also be obtained from the video bitstream or as separate data to be transmitted with the bitstream. The adaptation parameter can be included in a supplemental enhancement information (SEI) message at sequence level, frame level, or at a cube face level. The SEI message can be part of the video bitstream or can be standalone data. The adaptation parameter can also be defined in various parameter sets at a sequence level, at a picture level, in a tile header, in a slice header, or in other suitable level and/or granularity for a video bitstream.

Figure 8:
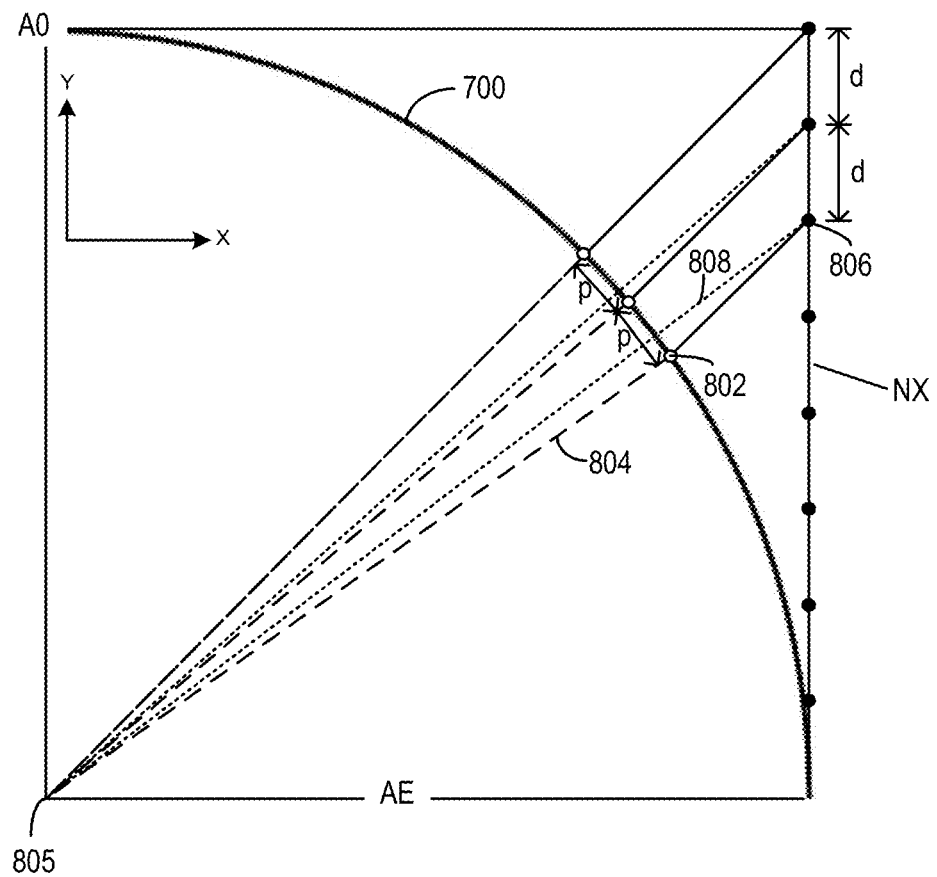
FIG. 8 is a graph illustrate an example of adaptive perturbed cube map projection, in accordance with some examples.

FIG. 8 illustrates an example of the effect of introducing the adaptation parameter in the mapping of the sampled points on sphere 700 to the cube faces. As shown in FIG. 8, as a result of the introducing the adaptation parameter, each sample point on sphere 700 and its corresponding mapping point on a cube face (e.g., cube face NX) is not on the same line. For example, the sampled point 802 is on the line 804 from the center 805 of the sphere 700, whereas the corresponding mapping point 806 (linked to sampled point 802 via a solid line) is on line 808 from the center 805 of the sphere 700. With such arrangements, both the mapping points and the sampled points can be equally spaced. For example, the mapping points are separated by an equal distance d on cube face NX, whereas the sampled points are separated by an equal distance p on sphere 700. With such arrangements, the uniformity of sampling, as well as the encoding efficiency, can be improved.

Figure 9A:
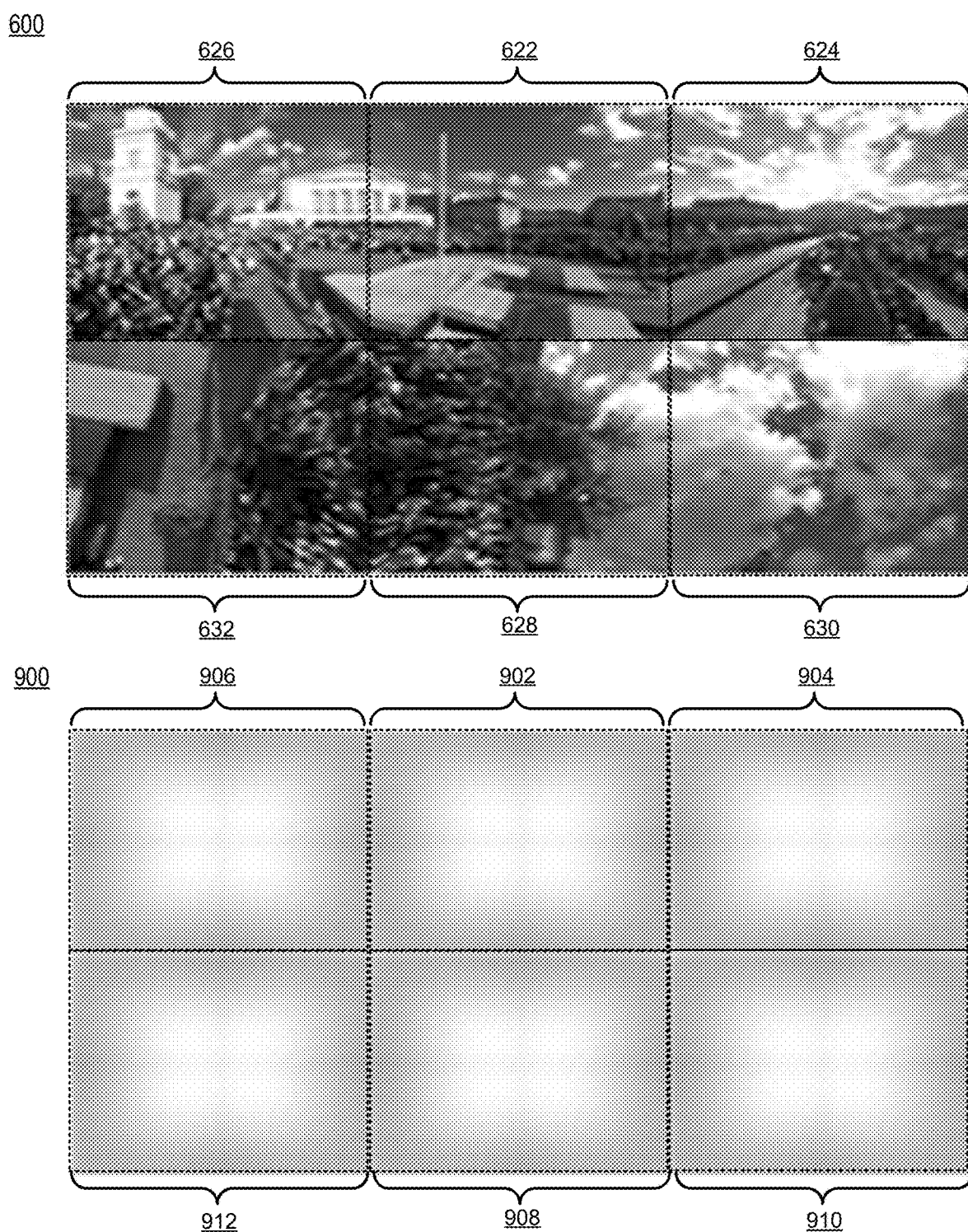
FIG. 9A and FIG. 9B are images illustrating example distributions of a 360-degree video picture samples in a cube map video frame using adaptive perturbed cube map projection, in accordance with some examples.
Figure 9B:
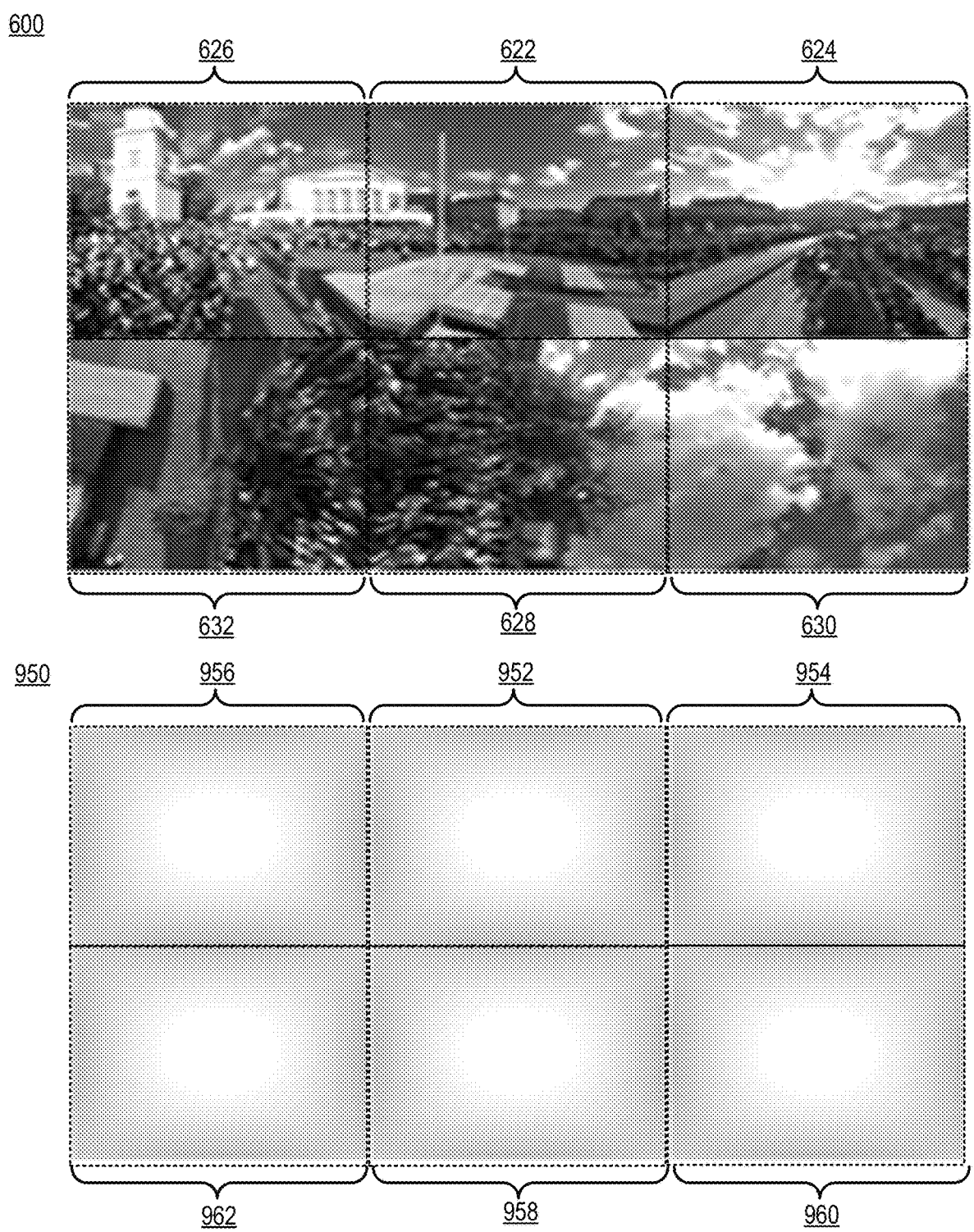

FIG. 9A and FIG. 9B illustrate examples of sampling distributions using an adaptive cube map projection. FIG. 9A illustrate a weight map 900. The weight map 900 may correspond to sampling distributions obtained by performing an adaptive cube map projection on video frame 600 by applying equations 11-13. The weight map 900 illustrates the sampling distributions 902, 904, 906, 908, 910 and 912, which correspond to, respectively, cube faces 622, 624, 626, 628, 630, and 632. Moreover, FIG. 9B illustrates a weight map 950. The weight map 950 may correspond to sampling distributions obtained by performing an adaptive cube map projection on video frame 600 by applying equations 14-17. The weight map 950 illustrates the sampling distributions 952, 954, 956, 958, 960 and 962, which correspond to, respectively, cube faces 622, 624, 626, 628, 630, and 632. Compared with the weight map 640 of FIG. 6, it can be seen that the degree of difference in the sampling density between the edges and the center of a cube face has been reduced in weight maps 900 and 950, which indicate improvements in the uniformity of sampling density. The more uniform sampling density can lead to an increase in coding efficiency.

Figure 10:
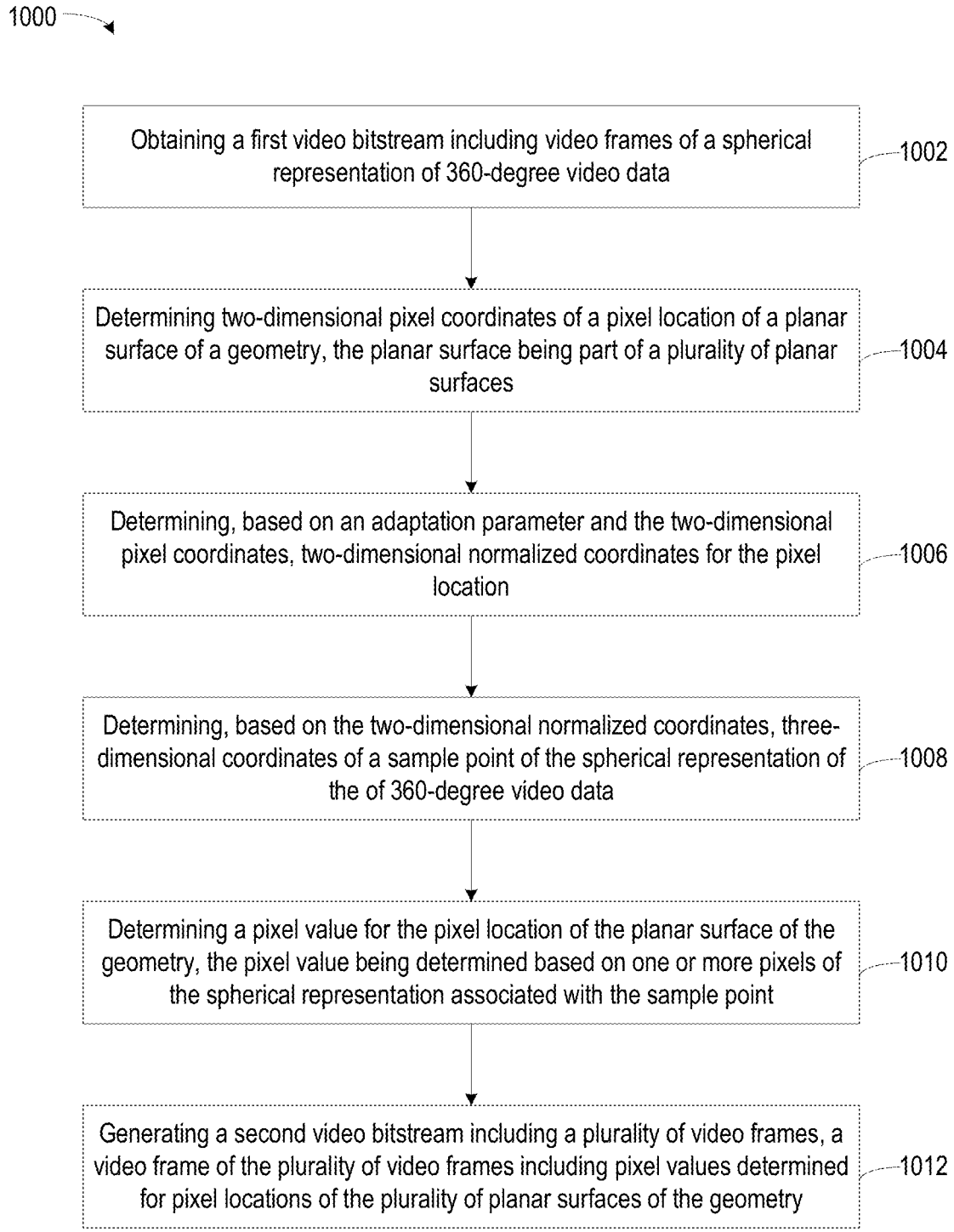
FIG. 10 is a flowchart illustrating an example of a process for processing 360-degree video data, in accordance with some examples.

FIG. 10 is a flowchart illustrating an example of a process 1000 for processing 360-degree video data using the techniques described herein. Process 1000 may be part of a 2D-to-3D cube map projection to, for example, encode a spherical representation of 360-degree video data into a cube map representation. At 1002, process 1000 includes obtaining a first video bitstream including video frames of a spherical representation of 360-degree video data. The video data may be captured from, for example, omnidirectional cameras, catadioptric cameras (a camera that uses lenses and curved mirrors), cameras equipped with fisheye lenses, and/or other suitable cameras. The spherical representation may represent a 360-degree scene or environment. A video frame of a spherical representation may include a plurality of pixels, with each pixel being associated with a three-dimensional coordinates defined along an X-axis, a Y-axis, and a Z-axis.

At 1004, process 1000 includes determining two-dimensional pixel coordinates of a pixel location of a planar surface of a geometry, the planar surface being part of a plurality of planar surfaces. For example, the geometry may be a cube, and the planar surface can be one of the six cube faces (e.g., one of cube faces PX, NX, PY, NY, PZ, and NZ of FIG. 7B). A sample point of the spherical representation to be mapped to the pixel location on the cube face can be determined based on the two-dimensional pixel coordinates.

At 1006, process 1000 includes determining, based on an adaptation parameter and the two-dimensional pixel coordinates, two-dimensional normalized coordinates for the pixel location. In some examples, a two-dimensional initial normalized coordinates (u', v') can be determined from the two-dimensional pixel coordinates (m, n) based on, for example, equations 11 and 12, and then then determine the two-dimensional normalized coordinates (u, v) from the two-dimensional initial normalized coordinates (u', v') based on, for example, equations 13-15 and/or equations 16-19, with both set of equations including an adaptation parameter. The adaptation parameter can be configured to improve the uniformity of sampling of the spherical representation. In some examples, the adaptation parameter can be set to 0.36 if equations 13-15 are used to determine the two-dimensional normalized coordinates (u, v). In some examples, the adaptation parameter can be set to 1 if equations 16 and 17 are used to determine the two-dimensional normalized coordinates (u, v). The adaptation parameter can be determined from, for example, an SEI message at sequence level, frame level, or at other suitable granularity. The SEI message can be part of the video bitstream or can be standalone data. The adaptation parameter can also be defined in various parameter sets at a sequence level, at a picture level, in a tile header, in a slice header, or in other suitable level and/or granularity for a video bitstream.

At 1008, process 1000 includes determining, based on the two-dimensional normalized coordinates, three-dimensional coordinates (X, Y, Z) of a sample point of the spherical representation of the 360-degree video data. The three-dimensional coordinates can be determined based on, for example, Table 2 as described above. The conversion of the two-dimensional normalized coordinates (u, v) to the three-dimensional coordinates (X, Y, Z) can be different for different cube faces.

At 1010, process 1000 includes determining a pixel value for the pixel location of the planar surface of the geometry, the pixel value being determined based on one or more pixels of the spherical representation associated with the sample point. For example, in a case where the sample point corresponds to a pixel location in the spherical representation, the pixel value for the pixel location of the planar surface can be determined by copying the pixel value at the sample point of the spherical representation. In a case where the sample point does not correspond to a pixel location in the spherical representation, the pixel value for the pixel location of the planar surface can be determined based on, for example, interpolating one or more pixel values at pixel locations that are the closest to the sample point.

At 1012, process 1000 includes generating a second video bitstream including a plurality of video frames, a video frame of the plurality of video frames including pixel values determined for pixel locations of the plurality of planar surfaces of the geometry. The video bitstream may include, for each video frame, a cube map representation. The cube map representation may include a set of pixel values and information that associate the set of pixel values with a cube face and the pixel coordinates (and/or normalized coordinates) on that cube face. In some examples, as part of the encoding process to generate a video bitstream including a cube map representation, the adaptation parameter can be included in the video bitstream or as separate data to be transmitted with the bitstream, to signal the adaptation parameter to the decoder. For example, an SEI message can be generated at sequence level, frame level, or at a cube face level, and include the adaptation parameter in the SEI message. The SEI message can be part of the video bitstream or can be standalone data. The adaptation parameter can also be defined in various parameter sets at a sequence level, at a picture level, in a tile header, in a slice header, or in other suitable level and/or granularity for the video bitstream including the cube map representation.

Figure 11:
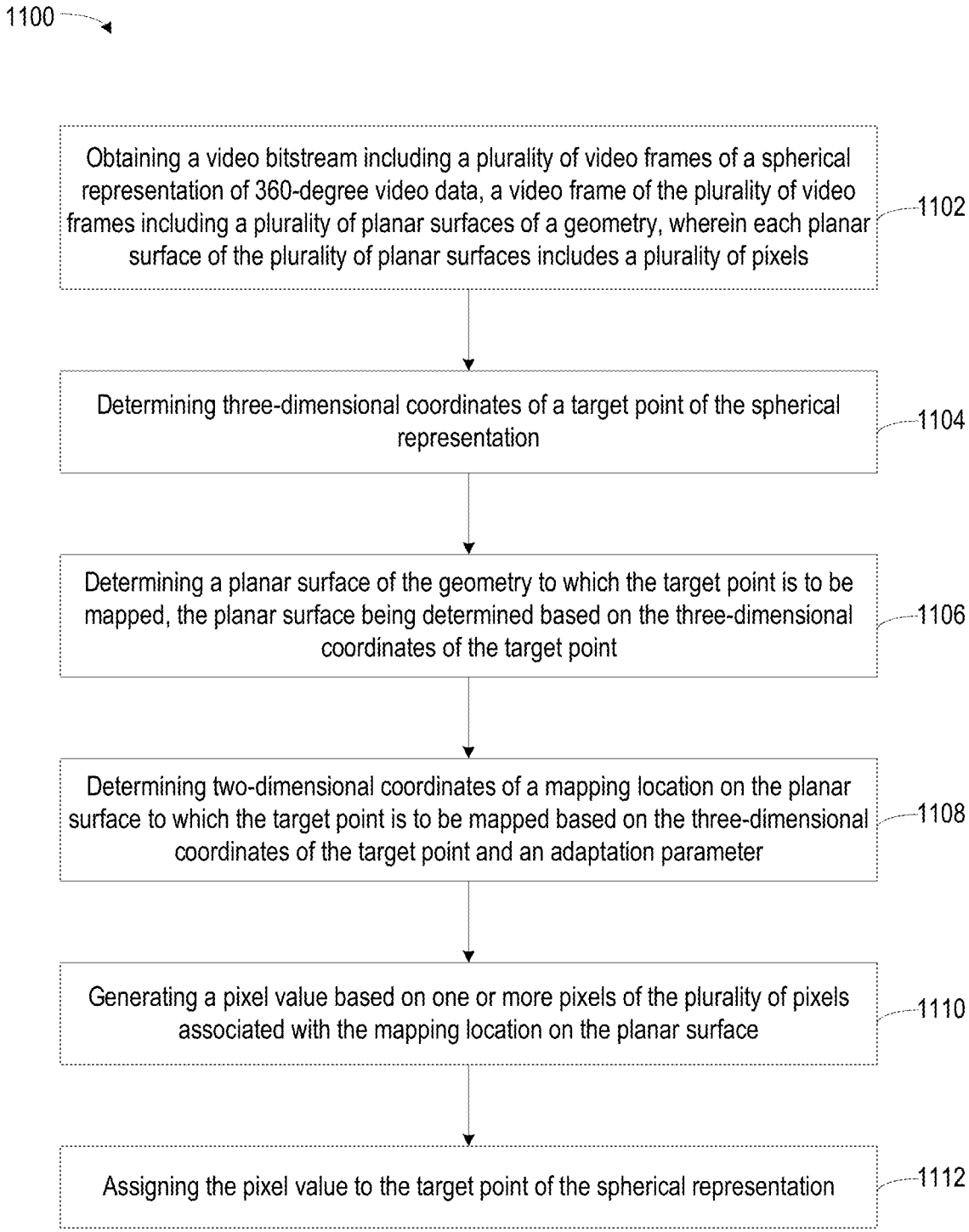
FIG. 11 is a flowchart illustrating another example of a process for processing 360-degree video data, in accordance with some examples.

FIG. 11 is a flowchart illustrating an example of a process 1100 for processing 360-degree video data using the techniques described herein. Process 1100 may be part of a 3D-to-2D coordinate mapping to, for example, decode the cube map representation for reconstructing a spherical representation of the 360-degree video data. At 1102, process 1100 may include obtaining a video bitstream including a plurality of video frames of a spherical representation of 360-degree video data, a video frame of the plurality of video frames including a plurality of planar surfaces of a geometry, wherein each planar surface of the plurality of planar surfaces includes a plurality of pixels. For example, the geometry may be a cube, and the planar surface can be one of the six cube faces (e.g., one of cube faces PX, NX, PY, NY, PZ, and NZ of FIG. 7B). The video bitstream may include a cube map representation generated based on, for example, process 1000.

At 1104, process 1100 includes determining three-dimensional coordinates of a target point of the spherical representation. The determination of the target point may be to play back a 360-degree video on a 360-degree video display device. To play back the video, a viewport can be rendered for display to the user, and the target point can be determined based on the viewport. A pixel is to be pulled from the cube map representation and projected to the target point for rendering.

At 1106, process 1100 includes determining a planar surface of the geometry to which the target point is to be mapped, the planar surface being determined based on the three-dimensional coordinates of the target point. The determination of the planar surface (e.g., which of the cube faces PX, NX, PY, NY, PZ, and NZ of FIG. 7B) can be based on, for example, Table 3 as described above. The three-dimensional (X, Y, Z) coordinates can be tested against the conditions listed in the first column of Table 3 to determine which cube face the target point is to be mapped from.

At 1108, process 1100 includes determining two-dimensional coordinates of a mapping location on the planar surface to which the target point is to be mapped based on the three-dimensional coordinates of the target point and an adaptation parameter. In some examples, based on Table 3, the cube face to which the target point is mapped can be determined, and two-dimensional initial normalized coordinates (u', v') can be determined. Two dimensional normalized coordinates (u, v) can be determined from the two-dimensional initial normalized coordinates (u', v') based on, for example, equations 20 and 21 or equations 22-25. In a case where equations 20 and 21 are used, the adaptation parameter can be set to 0.36 or a value of adaptation parameter used to generate the cube map representation. In a case where equations 22-25 are used, the adaptation parameter can be set to 1 (or a value used to generate the cube map representation).

At 1110, process 1100 includes generating a pixel value based on one or more pixels of the plurality of pixels associated with the mapping location on the planar surface. For example, in a case where the mapping location corresponds to a pixel location, the pixel value can be generated based on the pixel at the mapping location. In a case where the mapping location does not correspond to a mapping location, the pixel value can be generated based on one or more pixels that are closest to the mapping location.

At 1112, process 1100 includes assigning the pixel value to the target point of the spherical representation. For example, the pixel value and the three-dimensional coordinates (X, Y, Z) can be provided to a viewport for rendering.

In some examples, process 1000 may be performed by a computing device or an apparatus, such as encoding device 104, whereas process 1100 may be performed by decoding device 112. Processes 1000 and 1100 may also be performed by any other computing device. In some cases, the computing device or apparatus may include a processor, microprocessor, microcomputer, or other component of a device that is configured to carry out the steps of process 1000 and process 1100. In some examples, the computing device or apparatus may include a camera configured to capture video data (e.g., a video sequence) including video pictures. For example, the computing device may include a camera device, which may or may not include a video codec. The camera can be configured to capture 360-degree video, such as spherical video pictures. In some examples, the computing device may include a mobile device with a camera that can capture 360-degree video (e.g., a camera device such as a digital camera, an IP camera or the like, a mobile phone or tablet including a camera, or other type of device). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or other network data.

Processes 1000 and 1100 are illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes 1000 and 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program that includes instructions executable by one or more processors. The computer-readable or machine-readable storage medium may be non-transitory.

The video data captured by a camera (e.g., a fisheye camera, or other suitable camera or cameras) can be coded to reduce the amount of data needed for transmission and storage. In some examples, a system includes a source device that provides encoded video data to be decoded at a later time by a destination device. In particular, the source device provides the video data to the destination device via a computer-readable medium. The source device and the destination device may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may include any type of medium or device capable of moving the encoded video data from the source device to the destination device. In one example, the computer-readable medium may include a communication medium to enable the source device to transmit encoded video data directly to the destination device in real-time. The encoded video data may be modulated according to a communication standard, such as a wireless communication protocol, and transmitted to the destination device. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the destination device.

In some examples, encoded data may be output from output interface to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example, the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further example, the video source may generate computer graphics-based data as the source video, or a combination of live video, archived video, and computer-generated video. In some cases, if the video source is a video camera, the source device and the destination device may form so-called camera phones or video phones capable of communicating using wireless applications. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may be any of a variety of display devices such as a cathode ray tube (CRT), a liquid crystal display (LCD), a plasma display, an organic light emitting diode (OLED) display, or another type of display device. Various embodiments of the application have been described.

Figure 12:
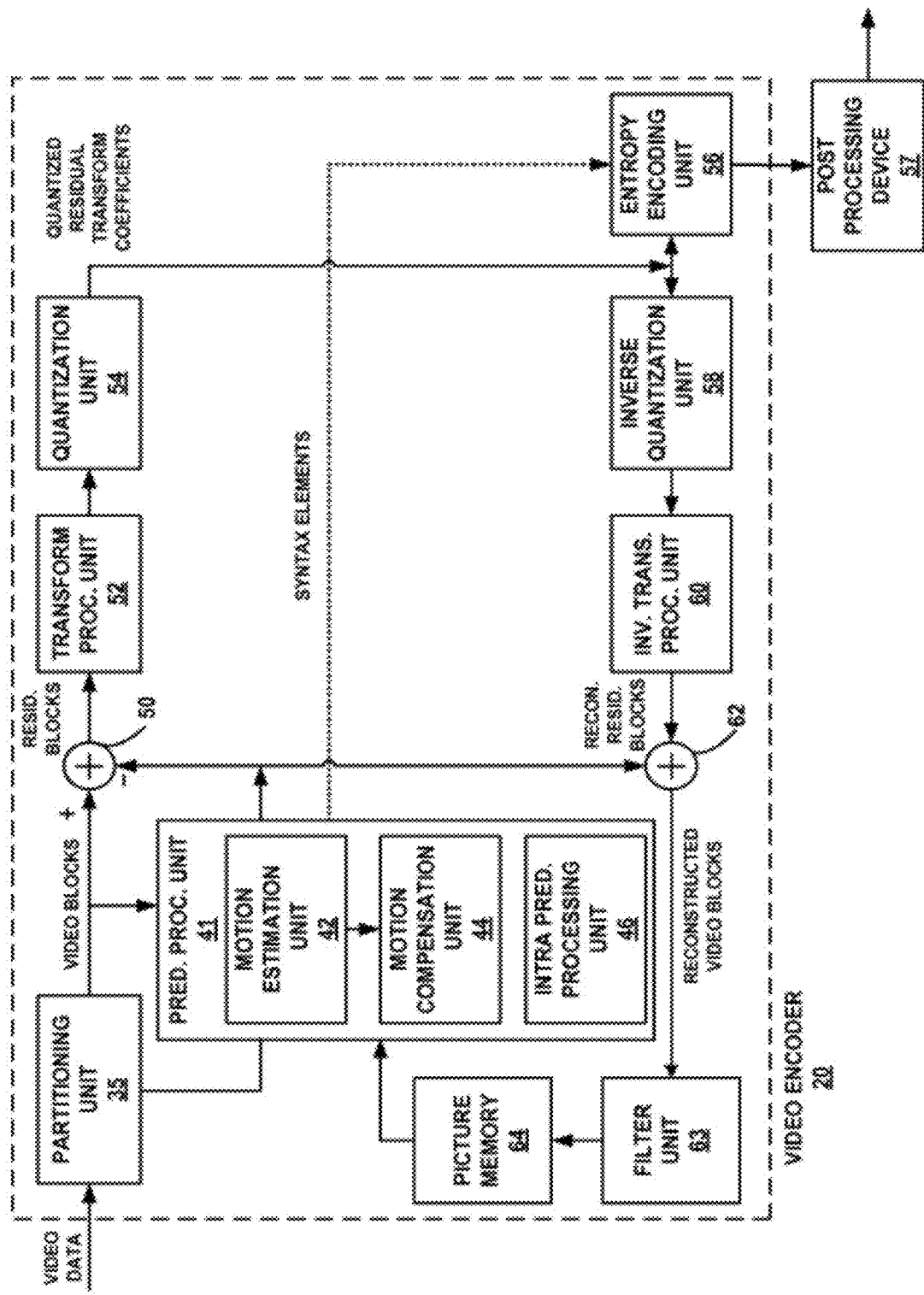
FIG. 12 is a block diagram illustrating an example video encoding device, in accordance with some examples.
Figure 13:
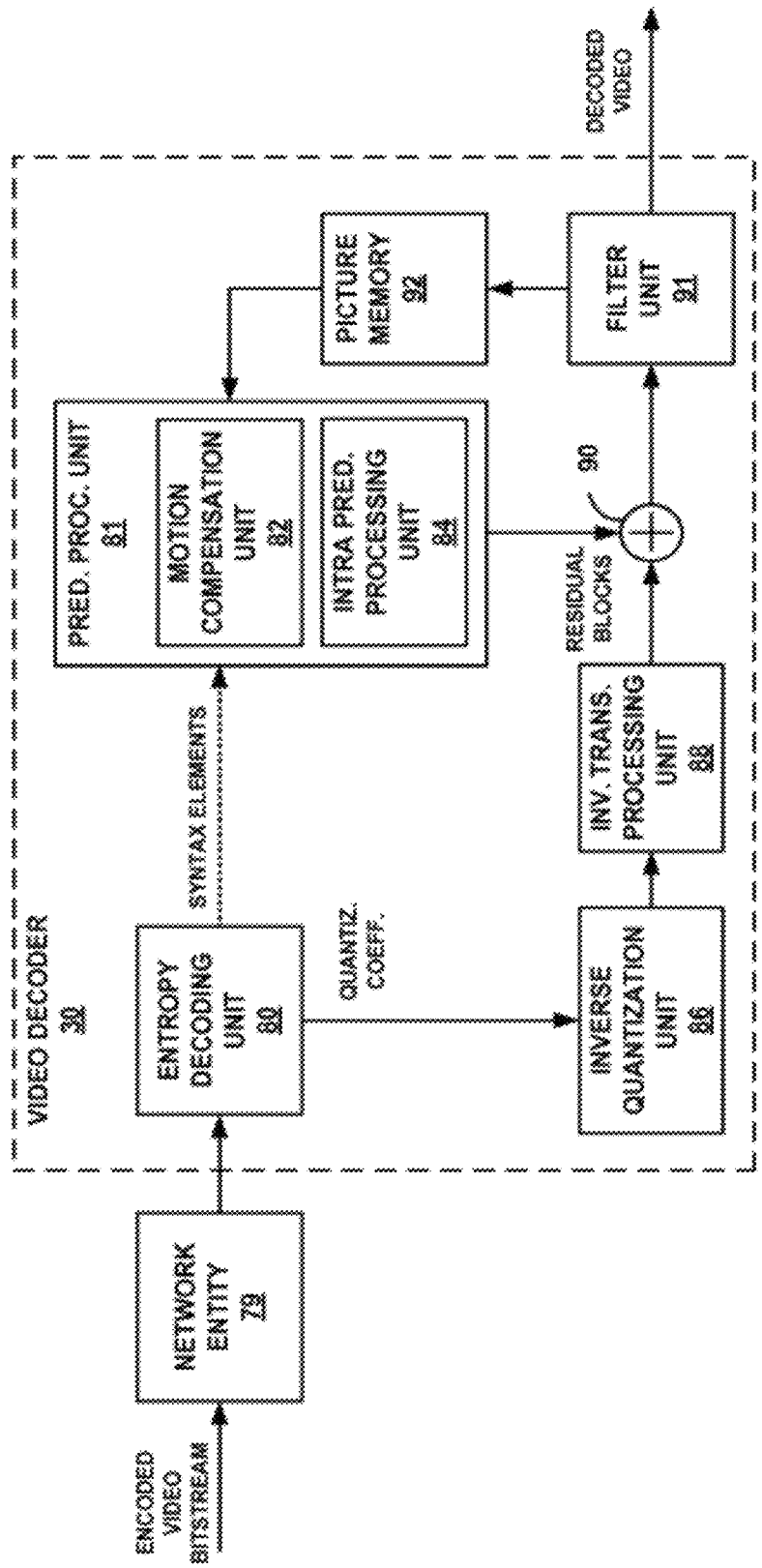
FIG. 13 is a block diagram illustrating an example video decoding device, in accordance with some examples.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). The encoding device 104 may perform intra-prediction and inter-prediction coding of video blocks within video slices. As previously described, intra-coding relies, at least in part, on spatial prediction to reduce or remove spatial redundancy within a given video picture. Inter-coding relies, at least in part, on temporal prediction to reduce or remove temporal redundancy within adjacent or surrounding pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, the encoding device 104 also includes inverse quantization unit 58, inverse transform processing unit 60, and summer 62. The filter unit 63 is intended to represent one or more loop filters such as a deblocking filter, an adaptive loop filter (ALF), and a sample adaptive offset (SAO) filter. Although the filter unit 63 is shown in FIG. 12 as being an in loop filter, in other configurations, the filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by the post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). The prediction processing unit 41 may select one of multiple possible coding modes, such as one of multiple intra-prediction coding modes or one of multiple inter-prediction coding modes, for the current video block based on error results (e.g., coding rate and the level of distortion, or the like). The prediction processing unit 41 may provide the resulting intra- or inter-coded block to the summer 50 to generate residual block data and to the summer 62 to reconstruct the encoded block for use as a reference picture.

The intra-prediction processing unit 46 within the prediction processing unit 41 may perform intra-prediction coding of the current video block relative to one or more neighboring blocks in the same picture or slice as the current block to be coded in order to provide spatial compression. The motion estimation unit 42 and the motion compensation unit 44 within prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices, B slices, or GPB slices. The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a prediction unit (PU) of a video block within a current video picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in the picture memory 64. For example, the encoding device 104 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the picture memory 64. The motion estimation unit 42 sends the calculated motion vector to entropy the encoding unit 56 and the motion compensation unit 44.

Motion compensation, performed by the motion compensation unit 44, may involve fetching or generating the predictive block based on the motion vector determined by motion estimation, possibly performing interpolations to sub-pixel precision. Upon receiving the motion vector for the PU of the current video block, the motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation unit 44 may also generate syntax elements associated with the video blocks and the video slice for use by the decoding device 112 in decoding the video blocks of the video slice.

The intra-prediction processing unit 46 may intra-predict a current block, as an alternative to the inter-prediction performed by the motion estimation unit 42 and motion the compensation unit 44, as described above. In particular, the intra-prediction processing unit 46 may determine an intra-prediction mode to use to encode a current block. In some examples, the intra-prediction processing unit 46 may encode a current block using various intra-prediction modes, e.g., during separate encoding passes, and the intra-prediction unit processing 46 may select an appropriate intra-prediction mode to use from the tested modes. For example, the intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. The intra-prediction processing unit 46 may calculate ratios from the distortions and rates for the various encoded blocks to determine which intra-prediction mode exhibits the best rate-distortion value for the block.

In any case, after selecting an intra-prediction mode for a block, the intra-prediction processing unit 46 may provide information indicative of the selected intra-prediction mode for the block to the entropy encoding unit 56. The entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include intra-prediction mode index tables and modified intra-prediction mode index tables (also referred to as codeword mapping tables).

After the prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to the transform processing unit 52. The transform processing unit 52 transforms the residual video data into residual transform coefficients using a transform, such as a discrete cosine transform (DCT) or a conceptually similar transform. The transform processing unit 52 may convert the residual video data from a pixel domain to a transform domain, such as a frequency domain.

The transform processing unit 52 may send the resulting transform coefficients to the quantization unit 54. The quantization unit 54 quantizes the transform coefficients to further reduce bitrate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively, the entropy encoding unit 56 may perform the scan.

Following quantization, the entropy encoding unit 56 entropy encodes the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by the entropy encoding unit 56, the encoded bitstream may be transmitted to the decoding device 112, or archived for later transmission or retrieval by the decoding device 112. The entropy encoding unit 56 may also entropy encode the motion vectors and the other syntax elements for the current video slice being coded.

The inverse quantization unit 58 and the inverse transform processing unit 60 apply inverse quantization and inverse transformation, respectively, to reconstruct the residual block in the pixel domain for later use as a reference block of a reference picture. The motion compensation unit 44 may calculate a reference block by adding the residual block to a predictive block of one of the reference pictures within a reference picture list. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reference block for storage in the picture memory 64. The reference block may be used by the motion estimation unit 42 and the motion compensation unit 44 as a reference block to inter-predict a block in a subsequent video picture.

In this manner, the encoding device 104 of FIG. 12 represents an example of a video encoder configured to determine adaptive parameters for video coding, as described above. For instance, the encoding device 104 may perform any of the techniques described herein, including the processes described above with respect to FIG. 10. In some cases, some of the techniques of this disclosure may also be implemented by the post processing device 57.

FIG. 13 is a block diagram illustrating an example the decoding device 112. The decoding device 112 includes an entropy decoding unit 80, prediction processing unit 81, inverse quantization unit 86, inverse transform processing unit 88, summer 90, filter unit 91, and picture memory 92. The prediction processing unit 81 includes the motion compensation unit 82 and the intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. The network entity 79 may or may not include the encoding device 104. Some of the techniques described in this disclosure may be implemented by the network entity 79 prior to the network entity 79 transmitting the encoded video bitstream to the decoding device 112. In some video decoding systems, network entity 79 and the decoding device 112 may be parts of separate devices, while in other instances, the functionality described with respect to the network entity 79 may be performed by the same device that includes the decoding device 112.

The entropy decoding unit 80 of the decoding device 112 entropy decodes the bitstream to generate quantized coefficients, motion vectors, and other syntax elements. The entropy decoding unit 80 forwards the motion vectors and other syntax elements to the prediction processing unit 81. The decoding device 112 may receive the syntax elements at the video slice level and/or the video block level. The entropy decoding unit 80 may process and parse both fixed-length syntax elements and variable-length syntax elements in or more parameter sets, such as a VPS, SPS, and PPS.

When the video slice is coded as an intra-coded (I) slice, the intra prediction processing unit 84 of the prediction processing unit 81 may generate prediction data for a video block of the current video slice based on a signaled intra-prediction mode and data from previously decoded blocks of the current picture. When the video frame is coded as an inter-coded (i.e., B, P or GPB) slice, the motion compensation unit 82 of the prediction processing unit 81 produces predictive blocks for a video block of the current video slice based on the motion vectors and other syntax elements received from the entropy decoding unit 80. The predictive blocks may be produced from one of the reference pictures within a reference picture list. The decoding device 112 may construct the reference frame lists, List 0 and List 1, using default construction techniques based on reference pictures stored in the picture memory 92.

The motion compensation unit 82 determines prediction information for a video block of the current video slice by parsing the motion vectors and other syntax elements, and uses the prediction information to produce the predictive blocks for the current video block being decoded. For example, the motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by the encoding device 104 during encoding of the video blocks to calculate interpolated values for sub-integer pixels of reference blocks. In this case, the motion compensation unit 82 may determine the interpolation filters used by the encoding device 104 from the received syntax elements, and may use the interpolation filters to produce predictive blocks.

The inverse quantization unit 86 inverse quantizes, or de-quantizes, the quantized transform coefficients provided in the bitstream and decoded by the entropy decoding unit 80. The inverse quantization process may include use of a quantization parameter calculated by the encoding device 104 for each video block in the video slice to determine a degree of quantization and, likewise, a degree of inverse quantization that should be applied. The inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After the motion compensation unit 82 generates the predictive block for the current video block based on the motion vectors and other syntax elements, the decoding device 112 forms a decoded video block by summing the residual blocks from the inverse transform processing unit 88 with the corresponding predictive blocks generated by the motion compensation unit 82. The summer 90 represents the component or components that perform this summation operation. If desired, loop filters (either in the coding loop or after the coding loop) may also be used to smooth pixel transitions, or to otherwise improve the video quality. The filter unit 91 is intended to represent one or more loop filters such as a deblocking filter, an adaptive loop filter (ALF), and a sample adaptive offset (SAO) filter. Although the filter unit 91 is shown in FIG. 13 as being an in loop filter, in other configurations, the filter unit 91 may be implemented as a post loop filter. The decoded video blocks in a given picture are then stored in the picture memory 92, which stores reference pictures used for subsequent motion compensation. The picture memory 92 also stores decoded video for later presentation on a display device, such as the video destination device 122 shown in FIG. 1.

In this manner, the decoding device 112 of FIG. 13 represents an example of a video decoder configured to determine adaptive parameters, as described above. For instance, in some cases, the decoding device 112 may perform any of the techniques described herein, including the processes described above with respect to FIG. 11.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium that includes program code including instructions that, when executed, performs one or more of the methods described above. The computer-readable data storage medium may form part of a computer program product, which may include packaging materials. The computer-readable medium may include memory or data storage media, such as random access memory (RAM)

such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for processing video data, comprising:
    obtaining a first video bitstream including video frames of a spherical representation of 360-degree video data;
    determining two-dimensional pixel coordinates of a pixel location of a planar surface of a geometry, the planar surface being part of a plurality of planar surfaces;
    determining, for the pixel location of the planar surface, initial two-dimensional normalized coordinate values based on the two-dimensional pixel coordinates of the pixel location;
    determining two-dimensional normalized coordinates for the pixel location as a function of an adaptation parameter and the initial two-dimensional normalized coordinate values, the adaptation parameter improving uniform sampling of the spherical representation of the 360-degree video data;
    determining, based on the two-dimensional normalized coordinates, three-dimensional coordinates of a sample point of the spherical representation of the 360-degree video data;
    determining a pixel value for the pixel location of the planar surface of the geometry, the pixel value being determined based on one or more pixels of the spherical representation associated with the sample point; and
    generating a second video bitstream including a plurality of video frames, a video frame of the plurality of video frames including pixel values determined for pixel locations of the plurality of planar surfaces of the geometry.

2. The method of claim 1, wherein determining, based on the two-dimensional normalized coordinates, three-dimensional coordinates of the sample point includes:
    determining a planar surface of the plurality of planar surfaces;
    determining a first coordinate of the three-dimensional coordinates to be a constant based on the determined planar surface; and
    determining a second coordinate and a third coordinate of the three-dimensional coordinates based on the two-dimensional normalized coordinates and the determined planar surface.

3. The method of claim 1, wherein determining, for the pixel location, the two-dimensional normalized coordinates includes:
    determining a first two-dimensional coordinate of the two-dimensional normalized coordinates of the pixel location as a function of the adaptation parameter and a first initial two-dimensional normalized coordinate value of the initial two-dimensional normalized coordinate values; and
    determining a second two-dimensional coordinate of the two-dimensional normalized coordinates of the pixel location as a function of the adaptation parameter and a second initial two-dimensional normalized coordinate value of the initial two-dimensional normalized coordinate values.

4. The method of claim 1, wherein the function includes a signum (sgn) function and a square root function, and wherein the adaptation parameter is set to a first value based on the square root function.

5. The method of claim 1, wherein the function includes a tangent (tan) function, and wherein the adaptation parameter is set to a second value based on the tangent function.

6. The method of claim 1, wherein the function includes a piecewise linear model including multiple pivot points, and wherein at least one of the multiple pivot points is defined by the adaptation parameter.

7. The method of claim 1, further comprising including an indication of the adaptation parameter in the second video bitstream.

8. The method of claim 7, wherein the indication of the adaptation parameter is included in a header associated with a tile or a slice of the video frame or a parameter set associated with the video frame or with the plurality of video frames.

9. The method of claim 1, further comprising:
    generating a supplemental enhancement information (SEI) message; and
    including an indication of the adaptation parameter in the SEI message.

10. The method of claim 9, further comprising:
    transmitting the SEI message with the second video bitstream.

11. The method of claim 1, further comprising extracting the adaptation parameter from the first video bitstream.

12. The method of claim 1, further comprising extracting the adaptation parameter from an SEI message.

13. The method of claim 12, wherein the SEI message is included in the first video bitstream.

14. The method of claim 1, wherein the geometry includes a cube, wherein the plurality of planar surfaces correspond to six surfaces of the cube, and wherein each surface of the six surfaces is tangential to a sphere of the spherical representation.

15. An apparatus for processing video data, comprising:
    a memory configured to store 360-degree video data; and
    a processor configured to:

obtain a first video bitstream including video frames of a spherical representation of the 360-degree video data;

determine two-dimensional pixel coordinates of a pixel location of a planar surface of a geometry, the planar surface being part of a plurality of planar surfaces;

determine, for the pixel location of the planar surface, initial two-dimensional normalized coordinate values based on the two-dimensional pixel coordinates of the pixel location;

determine two-dimensional normalized coordinates for the pixel location as a function of an adaptation parameter and the initial two-dimensional normalized coordinate values, the adaptation parameter improving uniform sampling of the spherical representation of the 360-degree video data;

determine, based on the two-dimensional normalized coordinates, three-dimensional coordinates of a sample point of the spherical representation of the 360-degree video data;

determine a pixel value for the pixel location of the planar surface of the geometry, the pixel value being determined based on one or more pixels of the spherical representation associated with the sample point; and generate a second video bitstream including a plurality of video frames, a video frame of the plurality of video frames including pixel values determined for pixel locations of the plurality of planar surfaces of the geometry.

16. The apparatus of claim 15, wherein the processor is further configured to:
determine a planar surface of the plurality of planar surfaces;
determine a first coordinate of the three-dimensional coordinates to be a constant based on the determined planar surface; and
determine a second coordinate and a third coordinate of the three-dimensional coordinates based on the two-dimensional normalized coordinates and the determined planar surface.

17. The apparatus of claim 15, wherein the processor is further configured to:
determine a first two-dimensional coordinate of the two-dimensional normalized coordinates of the pixel location as a function of the adaptation parameter and a first initial two-dimensional normalized coordinate value of the initial two-dimensional normalized coordinate values; and
determine a second two-dimensional coordinate of the two-dimensional normalized coordinates of the pixel location as a function of the adaptation parameter and a second initial two-dimensional normalized coordinate value of the initial two-dimensional normalized coordinate values.

18. The apparatus of claim 15, wherein the function includes a signum (sgn) function and a square root function, and wherein the adaptation parameter is set to a first value based on the square root function.

19. The apparatus of claim 15, wherein the function includes a tangent (tan) function, and wherein the adaptation parameter is set to a second value based on the tangent function.

20. The apparatus of claim 15, wherein the function includes a piecewise linear model including multiple pivot points, and wherein at least one of the multiple pivot points is defined by the adaptation parameter.

21. The apparatus of claim 15, wherein the processor is further configured to include an indication of the adaptation parameter in the second video bitstream.

22. The apparatus of claim 21, wherein the indication of the adaptation parameter is included in a header associated with a tile or a slice of the video frame or a parameter set associated with the video frame or with the plurality of video frames.

23. The apparatus of claim 15, wherein the processor is further configured to:
generate a supplemental enhancement information (SEI) message; and
include an indication of the adaptation parameter in the SEI message.

24. The apparatus of claim 23, wherein the processor is further configured to:
transmit the SEI message with the second video bitstream.

25. The apparatus of claim 15, wherein the processor is further configured to extract the adaptation parameter from the first video bitstream.

26. The apparatus of claim 15, wherein the processor is further configured to extract the adaptation parameter from an SEI message.

27. The apparatus of claim 15, wherein the geometry includes a cube, wherein the plurality of planar surfaces correspond to six surfaces of the cube, and wherein each surface of the six surfaces is tangential to a sphere of the spherical representation.

28. The apparatus of claim 15, wherein the apparatus comprises a mobile device with one or more cameras to capture the 360-degree video data.

29. A non-transitory computer-readable medium having stored thereon instructions that, when executed by one or more processors, cause the one or more processors to:
obtain a first video bitstream including video frames of a spherical representation of 360-degree video data;
determine two-dimensional pixel coordinates of a pixel location of a planar surface of a geometry, the planar surface being part of a plurality of planar surfaces;
determine, for the pixel location of the planar surface, initial two-dimensional normalized coordinate values based on the two-dimensional pixel coordinates of the pixel location;
determine two-dimensional normalized coordinates for the pixel location as a function of an adaptation parameter and the initial two-dimensional normalized coordinate values, the adaptation parameter improving uniform sampling of the spherical representation of the 360-degree video data;
determine, based on the two-dimensional normalized coordinates, three-dimensional coordinates of a sample point of the spherical representation of the 360-degree video data;
determine a pixel value for the pixel location of the planar surface of the geometry, the pixel value being determined based on one or more pixels of the spherical representation associated with the sample point; and
generate a second video bitstream including a plurality of video frames, a video frame of the plurality of video frames including pixel values determined for pixel locations of the plurality of planar surfaces of the geometry.

30. An apparatus comprising:
means for obtaining a first video bitstream including video frames of a spherical representation of 360-degree video data;

means for determining two-dimensional pixel coordinates of a pixel location of a planar surface of a geometry, the planar surface being part of a plurality of planar surfaces;

means for determining, for the pixel location of the planar surface, initial two-dimensional normalized coordinate values based on the two-dimensional pixel coordinates of the pixel location;

means for determining two-dimensional normalized coordinates for the pixel location as a function of an adaptation parameter and the initial two-dimensional normalized coordinate values, the adaptation parameter improving uniform sampling of the spherical representation of the 360-degree video data;

means for determining, based on the two-dimensional normalized coordinates, three-dimensional coordinates of a sample point of the spherical representation of the 360-degree video data;

means for determining a pixel value for the pixel location of the planar surface of the geometry, the pixel value being determined based on one or more pixels of the spherical representation associated with the sample point; and means for generating a second video bitstream including a plurality of video frames, a video frame of the plurality of video frames including pixel values determined for pixel locations of the plurality of planar surfaces of the geometry.

31. The non-transitory computer-readable medium of claim 29, further comprising instructions that, when executed by the one or more processors, cause the one or more processors to:
  determine a planar surface of the plurality of planar surfaces;
  determine a first coordinate of the three-dimensional coordinates to be a constant based on the determined planar surface; and
  determine a second coordinate and a third coordinate of the three-dimensional coordinates based on the two-dimensional normalized coordinates and the determined planar surface.

32. The non-transitory computer-readable medium of claim 29, further comprising instructions that, when executed by the one or more processors, cause the one or more processors to:
  determine a first two-dimensional coordinate of the two-dimensional normalized coordinates of the pixel location as a function of the adaptation parameter and a first initial two-dimensional normalized coordinate value of the initial two-dimensional normalized coordinate values; and
  determine a second two-dimensional coordinate of the two-dimensional normalized coordinates of the pixel location as a function of the adaptation parameter and a second initial two-dimensional normalized coordinate value of the initial two-dimensional normalized coordinate values.

* * * * *